(12) United States Patent
Raghavan et al.

(10) Patent No.: US 11,811,483 B2
(45) Date of Patent: Nov. 7, 2023

(54) TECHNIQUES FOR A UE TO REQUEST SOUNDING REFERENCE SIGNAL RESOURCES AND A BASE STATION TO CONVEY UE SIDE BEAM WEIGHTS

(71) Applicant: QUALCOMM Incorporated, San Diego, CA (US)

(72) Inventors: Vasanthan Raghavan, West Windsor Township, NJ (US); Tao Luo, San Diego, CA (US); Raghu Narayan Challa, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/322,723

(22) Filed: May 17, 2021

(65) Prior Publication Data
US 2022/0368402 A1 Nov. 17, 2022

(51) Int. Cl.
*H04B 7/08* (2006.01)
*H04B 7/06* (2006.01)
*H04L 5/00* (2006.01)
*H04L 25/02* (2006.01)
*H04B 7/01* (2006.01)

(52) U.S. Cl.
CPC ............ *H04B 7/088* (2013.01); *H04B 7/01* (2013.01); *H04B 7/0617* (2013.01); *H04B 7/0634* (2013.01); *H04L 5/0051* (2013.01); *H04L 25/0226* (2013.01)

(58) Field of Classification Search
CPC ........ H04B 7/088; H04B 7/01; H04B 7/0617; H04B 7/0634; H04L 5/0051; H04L 25/0226
See application file for complete search history.

(56) References Cited

U.S. PATENT DOCUMENTS

| | | | |
|---|---|---|---|
| 2020/0068549 A1* | 2/2020 | Kang | H04W 16/28 |
| 2020/0091978 A1* | 3/2020 | Noh | H04B 7/0695 |
| 2020/0128421 A1* | 4/2020 | Yang | H04B 7/022 |

* cited by examiner

*Primary Examiner* — Minh Trang T Nguyen
(74) *Attorney, Agent, or Firm* — Holland & Hart LLP

(57) ABSTRACT

Methods, systems, and devices for wireless communications are described. A user equipment (UE) may transmit, to a base station, a request for uplink reference signal resources for a beam training procedure. The UE may receive, in response to the transmitted request, control signaling identifying the uplink reference signal resources for the beam training procedure. The UE may transmit, using a set of multiple of beams, reference signals on the identified uplink reference signal resources and receive, in response to the transmitted reference signals, an indication of beam parameters for a beam at the UE. The UE may communicate with the base station using the beam at the UE according to the beam parameters.

30 Claims, 17 Drawing Sheets

TECHNIQUES FOR A UE TO REQUEST SOUNDING REFERENCE SIGNAL RESOURCES AND A BASE STATION TO CONVEY UE SIDE BEAM WEIGHTS

FIELD OF TECHNOLOGY

The following relates to wireless communications, including techniques for a user equipment (UE) to request sounding reference signal (SRS) resources and a base station to convey the beam weights to be used by the UE side.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and a base station may communicate using beamformed signaling. For some beamforming techniques, a UE and a base station may each transmit reference signals to select beams for communicating. Some techniques for beam selection are deficient.

SUMMARY

The described techniques relate to improved methods, systems, devices, and apparatuses that support techniques for a user equipment (UE) to request sounding reference signal (SRS) resources and a base station to convey UE side beam weights. Generally, the described techniques provide for performing uplink beam training at a base station to determine beam weights for a UE-side beam. For example, uplink beam training may be performed at the base station based on reference signals transmitted by the UE, and the base station may indicate beam weights for a beam used at the UE. In some cases, the UE may transmit a request to the base station for uplink reference signal resources for a beam training procedure. The base station may identify and grant the uplink reference signal resources to the UE for the beam training procedure. Based on the grant received from the base station, the UE may transmit reference signals (e.g., training symbols) on the identified uplink reference signal resources. In some cases, the UE may transmit reference signals, such as SRSs on the appropriately configured SRS resources. The base station may receive the reference signals and determine a best beam for both the uplink receive beam at the base station side and the uplink transmission beam at the UE side. According to some techniques, uplink beam training has been typically used for determining base station-side beam alone.

The base station may determine a set of adaptive beam weights corresponding to each of the uplink receive beam (e.g., at the base station) and the uplink transmission beam (e.g., at the UE). The base station may quantize the set of adaptive beam weights in terms of their phase shift levels and amplitudes. The base station may indicate the determined beam weights corresponding to the uplink transmission beam to the UE. Similarly, the base station may implement the determined beam weights corresponding to the uplink receive beam onto one or more antenna arrays at the base station. The base station and the UE may communicate using the uplink receive beam and the uplink transmission beam according to the set of adaptive beam weights.

A method for wireless communications at a UE is described. The method may include transmitting, to a base station, a request for uplink reference signal resources for a beam training procedure, receiving, in response to the transmitted request, control signaling identifying the uplink reference signal resources for the beam training procedure, transmitting, using a set of multiple beams, reference signals on the identified uplink reference signal resources, receiving, in response to the transmitted reference signals, an indication of beam parameters for a beam at the UE, and communicating with the base station using the beam at the UE according to the beam parameters.

An apparatus for wireless communications at a UE is described. The apparatus may include a processor, memory coupled with the processor, and instructions stored in the memory. The instructions may be executable by the processor to cause the apparatus to transmit, to a base station, a request for uplink reference signal resources for a beam training procedure, receive, in response to the transmitted request, control signaling identifying the uplink reference signal resources for the beam training procedure, transmit, using a set of multiple beams, reference signals on the identified uplink reference signal resources, receive, in response to the transmitted reference signals, an indication of beam parameters for a beam at the UE, and communicate with the base station using the beam at the UE according to the beam parameters.

Another apparatus for wireless communications at a UE is described. The apparatus may include means for transmitting, to a base station, a request for uplink reference signal resources for a beam training procedure, means for receiving, in response to the transmitted request, control signaling identifying the uplink reference signal resources for the beam training procedure, means for transmitting, using a set of multiple beams, reference signals on the identified uplink reference signal resources, means for receiving, in response to the transmitted reference signals, an indication of beam parameters for a beam at the UE, and means for communicating with the base station using the beam at the UE according to the beam parameters.

A non-transitory computer-readable medium storing code for wireless communications at a UE is described. The code may include instructions executable by a processor to transmit, to a base station, a request for uplink reference signal resources for a beam training procedure, receive, in response to the transmitted request, control signaling identifying the uplink reference signal resources for the beam training procedure, transmit, using a set of multiple beams, reference signals on the identified uplink reference signal resources, receive, in response to the transmitted reference signals, an indication of beam parameters for a beam at the UE, and communicate with the base station using the beam at the UE according to the beam parameters.

In some examples of the method, apparatuses, and non-transitory computer-readable medium described herein, receiving the indication of the beam parameters may include operations, features, means, or instructions for receiving an indication of a phase shift or an amplitude, or both, for the beam at the UE, where communicating with the base station using the beam at the UE may be based on the phase shift or the amplitude, or both.

In some examples of the method, apparatuses, and non-transitory computer-readable medium described herein, receiving the indication of the beam parameters for the beam at the UE may include operations, features, means, or instructions for receiving an indication of a set of adaptive beam weights, where the set of adaptive beam weights may be for the beam at the UE, or one or more beams of the base station, or both, and where communicating with the base station may be based on the set of adaptive beam weights.

In some examples of the method, apparatuses, and non-transitory computer-readable medium described herein, receiving the indication of the beam parameters may include operations, features, means, or instructions for receiving an indication of a set of sounding reference signal resource indicators and a corresponding set of beam weights for the set of sounding reference signal resource indicators, where the reference signals may be transmitted based on the set of sounding reference signal resource indicators.

In some examples of the method, apparatuses, and non-transitory computer-readable medium described herein, transmitting the request for the uplink reference signal resources may include operations, features, means, or instructions for transmitting the request including a number of resources or a time-frequency assignment within the resource block grid for the reference signals, where the control signaling identifies the uplink reference signal resources based on the number of resources and the time-frequency assignment request.

In some examples of the method, apparatuses, and non-transitory computer-readable medium described herein, the number of resources may be based on an uplink link budget, a first number of antennas at the UE, a second number of antennas at the base station, a first number of radio frequency transmit/receive chains at the UE, a second number of radio frequency transmit/receive chains at the base station, or any combination thereof.

Some examples of the method, apparatuses, and non-transitory computer-readable medium described herein may further include operations, features, means, or instructions for determining that a channel quality for a fixed beam associated with a fixed codebook fails to satisfy a threshold channel quality, the request transmitted in response to the channel quality failing to satisfy the threshold channel quality.

Some examples of the method, apparatuses, and non-transitory computer-readable medium described herein may further include operations, features, means, or instructions for transmitting, to the base station, an indication of an antenna array configuration at the UE, where the reference signals may be transmitted on the set of multiple beams according to the antenna array configuration.

In some examples of the method, apparatuses, and non-transitory computer-readable medium described herein, the indication of the antenna array configuration may be transmitted based on the received control signaling identifying more uplink reference signal resources than supported beamforming vectors at the UE.

In some examples of the method, apparatuses, and non-transitory computer-readable medium described herein, transmitting the uplink reference signals may include operations, features, means, or instructions for transmitting sounding reference signals on the set of multiple beams on the identified uplink reference signal resources.

In some examples of the method, apparatuses, and non-transitory computer-readable medium described herein, receiving the indication of the beam parameters may include operations, features, means, or instructions for receiving a DCI message or RRC signaling or MAC-CE indicating the beam parameters.

In some examples of the method, apparatuses, and non-transitory computer-readable medium described herein, the uplink reference signal resources may be contiguous in a time domain or a frequency domain.

A method for wireless communications at a base station is described. The method may include receiving, from a UE, a request for uplink reference signal resources for a beam training procedure, transmitting, in response to the received request, control signaling indicating the uplink reference signal resources for the beam training procedure, receiving reference signals on the identified uplink reference signal resources transmitted by a set of multiple beams, transmitting, in response to the received reference signals, an indication of beam parameters for a beam to be used at the UE, and communicating with the UE using a beam and the beam according to the beam parameters transmitted to the UE.

An apparatus for wireless communications at a base station is described. The apparatus may include a processor, memory coupled with the processor, and instructions stored in the memory. The instructions may be executable by the processor to cause the apparatus to receive, from a UE, a request for uplink reference signal resources for a beam training procedure, transmit, in response to the received request, control signaling indicating the uplink reference signal resources for the beam training procedure, receive reference signals on the identified uplink reference signal resources transmitted by a set of multiple beams, transmit, in response to the received reference signals, an indication of beam parameters for a beam to be used at the UE, and communicate with the UE using a beam and the beam according to the beam parameters transmitted to the UE.

Another apparatus for wireless communications at a base station is described. The apparatus may include means for receiving, from a UE, a request for uplink reference signal resources for a beam training procedure, means for transmitting, in response to the received request, control signaling indicating the uplink reference signal resources for the beam training procedure, means for receiving reference signals on the identified uplink reference signal resources transmitted by a set of multiple beams, means for transmitting, in response to the received reference signals, an indication of beam parameters for a beam to be used at the UE, and means for communicating with the UE using a beam and the beam according to the beam parameters transmitted to the UE.

A non-transitory computer-readable medium storing code for wireless communications at a base station is described. The code may include instructions executable by a processor to receive, from a UE, a request for uplink reference signal resources for a beam training procedure, transmit, in response to the received request, control signaling indicating the uplink reference signal resources for the beam training procedure, receive reference signals on the identified uplink reference signal resources transmitted by a set of multiple beams, transmit, in response to the received reference signals, an indication of beam parameters for a beam to be used at the UE, and communicate with the UE using a beam and the beam according to the beam parameters transmitted to the UE.

Some examples of the method, apparatuses, and non-transitory computer-readable medium described herein may further include operations, features, means, or instructions for determining a first set of beam parameters for the beam at the UE side and a second set of beam parameters for the base station-side beam based on the received reference signals, where the indication of the beam parameters for the beam at the UE side indicates the first set of beam parameters or the first set of beam parameters and the second set of beam parameters.

In some examples of the method, apparatuses, and non-transitory computer-readable medium described herein, transmitting the indication of the beam parameters may include operations, features, means, or instructions for transmitting an indication of a phase shift or an amplitude, or both, for the beam, where communicating with the base station using the beam may be based on the phase shift or the amplitude, or both.

In some examples of the method, apparatuses, and non-transitory computer-readable medium described herein, transmitting the indication of the beam parameters may include operations, features, means, or instructions for transmitting an indication of a set of sounding reference signal resource indicators and a corresponding set of beam weights for the set of sounding reference signal resource indicators, where the reference signals may be received based on the set of sounding reference signal resource indicators.

In some examples of the method, apparatuses, and non-transitory computer-readable medium described herein, receiving the request for the uplink reference signal resources may include operations, features, means, or instructions for receiving the request including a number of resources and a time-frequency assignment within the resource block grid for the reference signals, where the control signaling indicates the uplink reference signal resources based on the number of resources and the time-frequency assignment request.

In some examples of the method, apparatuses, and non-transitory computer-readable medium described herein, the number of resources may be based on an uplink link budget, a first number of antennas at the UE, a second number of antennas at the base station, a first number of radio frequency transmit/receive chains at the UE, a second number of radio frequency transmit/receive chains at the base station, or any combination thereof.

In some examples of the method, apparatuses, and non-transitory computer-readable medium described herein, receiving the uplink reference signals may include operations, features, means, or instructions for receiving sounding reference signals transmitted by the set of multiple beams on the identified uplink reference signal resources.

Some examples of the method, apparatuses, and non-transitory computer-readable medium described herein may further include operations, features, means, or instructions for receiving, from the UE, an indication of an antenna array configuration at the UE, where the beam parameters for the beam at the UE may be based on the antenna array configuration.

In some examples of the method, apparatuses, and non-transitory computer-readable medium described herein, the indication of the antenna array configuration may be received based on the transmitted control signaling indicating more uplink reference signal resources than supported beamforming vectors at the UE.

In some examples of the method, apparatuses, and non-transitory computer-readable medium described herein, transmitting the indication of the beam parameters for the beam at the UE may include operations, features, means, or instructions for transmitting an indication of a set of adaptive beam weights, where the set of adaptive beam weights may be for the beam at the UE, or the base station-side beam, or both, and where communicating with the UE may be based on the set of adaptive beam weights.

In some examples of the method, apparatuses, and non-transitory computer-readable medium described herein, transmitting the indication of the beam parameters for the beam at the UE may include operations, features, means, or instructions for transmitting a DCI message or RRC signaling or a MAC-CE indicating the beam parameters.

In some examples of the method, apparatuses, and non-transitory computer-readable medium described herein, the uplink reference signal resources may be contiguous in a time domain or a frequency domain.

DETAILED DESCRIPTION

Figure 1:
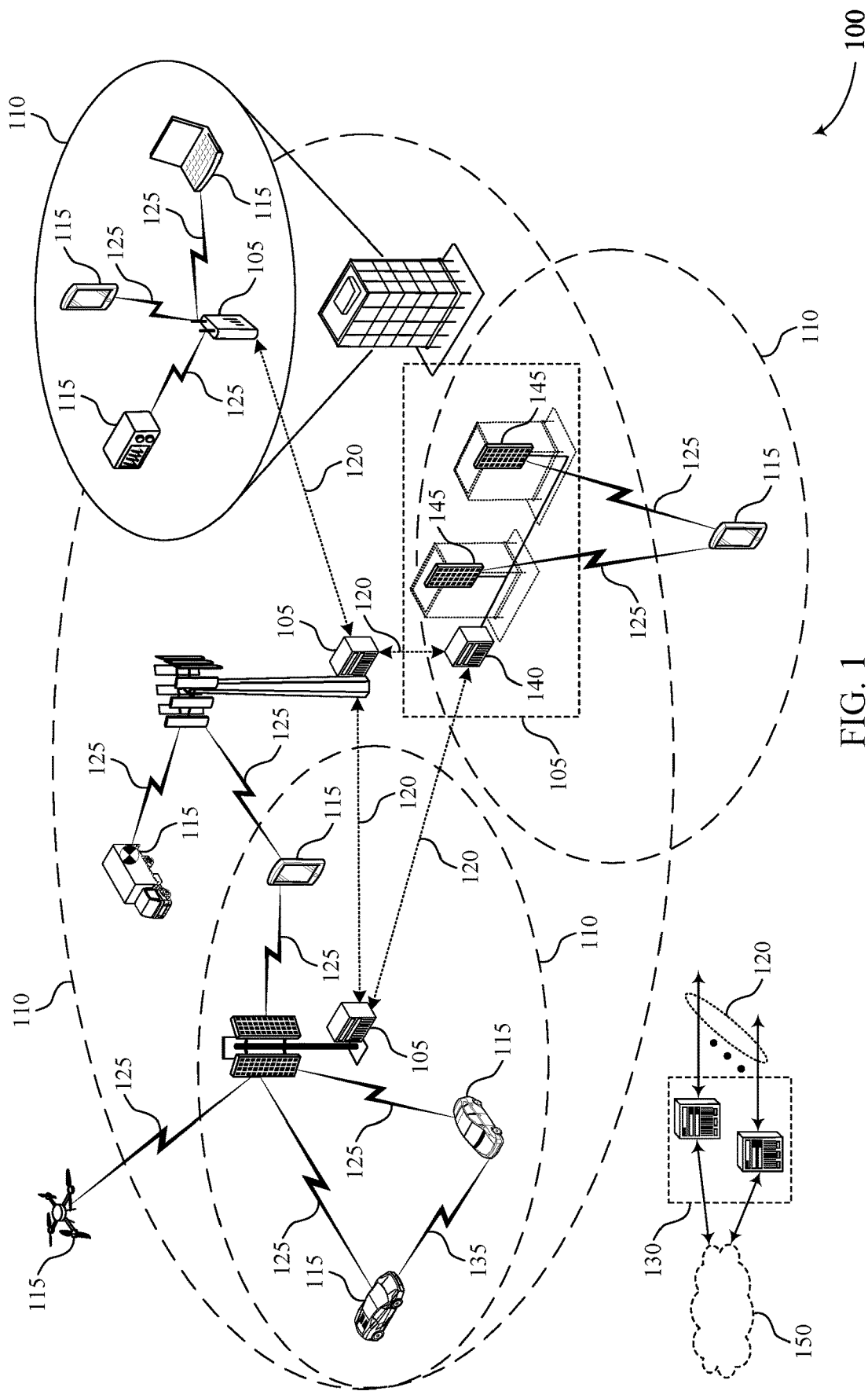
FIG. 1 illustrates an example of a wireless communications system that supports techniques for a UE to request sounding reference signal resources and a base station to convey UE side beam weights in accordance with aspects of the present disclosure.

Some wireless communications systems may utilize beamforming techniques for communications between wireless devices. For example, in millimeter wave (mmWave) systems, one or more antenna arrays at a device may form beams with a given beamwidth, frequency of interest, directivity, or the like. For example, one or more antenna arrays located at a base station may adopt beamforming weights (e.g., phase shift levels and/or amplitudes) to form an uplink receive beam and a downlink transmission beam with a user equipment (UE). Likewise, the UE may apply beamforming weights to one or more antenna arrays internal to the UE to form a corresponding uplink transmission beam and corresponding downlink receive beam.

In some examples, the wireless communications system may leverage fixed analog beamforming codebooks stored at the base station and the UE to determine beam weights to enable beamformed communications. In some cases, the UE and the base station may utilize beam weights from fixed codebooks to establish initial beam weights to support communications operations. In some examples, however, channel conditions may change such that the initial beam weights no longer satisfy one or more channel quality thresholds (e.g., change in channel environment, blockages, mobility of UE). In response to a degradation of beam quality, the base station and the UE may perform beam training to establish new beam weights that may improve signal quality within the wireless communications system. Similar to initial beamforming, a fixed codebook stored at the base station and the UE may be used to perform beam training to improve channel quality. However, the utilization of a fixed codebook may limit the number of beam weights, and therefore available beams, in some scenarios.

The present disclosure provides techniques to dynamically implement adaptive beam weights by performing uplink beam training at a base station. In some cases, the wireless communications system may utilize more adaptive and dynamic beam training procedures to improve channel quality, such as in response to degrading quality of beamformed communications. For example, uplink beam training may be performed at the base station based on reference signals transmitted by the UE, and the base station may indicate beam weights for a beam used at the UE. In some cases, the UE may transmit a request to the base station for uplink reference signal resources for a beam training procedure. In response to the transmitted request, the base station may identify and subsequently grant the uplink reference signal resources to the UE for the beam training procedure. Based on the grant received from the base station, the UE may transmit reference signals (e.g., training symbols) on the identified uplink reference signal resources. The base station may receive the training symbols and determine a best beam for both the uplink receive beam at the base station side and the uplink transmission beam at the UE side.

The base station may determine a set of adaptive beam weights corresponding to each of the uplink receive beam and the uplink transmission beam. The base station may quantize the set of adaptive beam weights in terms of their phase shift levels and amplitudes. Accordingly, the base station may indicate the determined beam weights corresponding to the uplink transmission beam to the UE. Similarly, the base station may implement the determined beam weights corresponding to the uplink receive beam onto one or more antenna arrays at the base station. The base station and the UE may communicate using the uplink receive beam and the uplink transmission beam according to the set of adaptive beam weights.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to techniques for a UE to request sounding reference signal resources and a base station to convey UE side beam weights.

FIG. 1 illustrates an example of a wireless communications system 100 that supports techniques for a UE to request sounding reference signal resources and a base station to convey UE side beam weights in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots.

Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE- Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a channel state information reference signal (CSI-RS), a burst of synchronization signal blocks (SSBs), etc.), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The described techniques relate to improved methods, systems, devices, and apparatuses that support techniques for a UE 115 to request sounding reference signal resources and a base station to convey UE side beam weights. Generally, the described techniques provide for performing uplink beam training at a base station to determine beam weights for a UE-side beam. For example, uplink beam training may be performed at the base station based on reference signals transmitted by the UE 115, and the base station 105 may indicate beam weights for a beam used at the UE 115. In some cases, the UE 115 may transmit a request to the base station for uplink reference signal resources for a beam training procedure. The base station 105 may identify and grant the uplink reference signal resources to the UE 115 for the beam training procedure. Based on the grant received from the base station, the UE 115 may transmit reference signals (e.g., training symbols) on the identified uplink reference signal resources. In some cases, the UE 115 may transmit reference signals, such as sounding reference signals (SRS), on SRS resources. The base station 105 may receive the reference signals and determine a best beam for both the uplink receive beam at the base station side and the uplink transmission beam at the UE side.

The base station may determine a set of adaptive beam weights corresponding each of the uplink receive beam (e.g., at the base station 105) and the uplink transmission beam (e.g., at the UE 115). The base station 105 may quantize the set of adaptive beam weights as phase shift levels and amplitudes. The base station 105 may indicate the determined beam weights corresponding to the uplink transmission beam to the UE 115. Similarly, the base station 105 may implement the determined beam weights corresponding to the uplink receive beam onto one or more antenna arrays at the base station. The base station 105 and the UE 115 may communicate using the uplink receive beam and the uplink transmission beam according to the set of adaptive beam weights.

Figure 2:
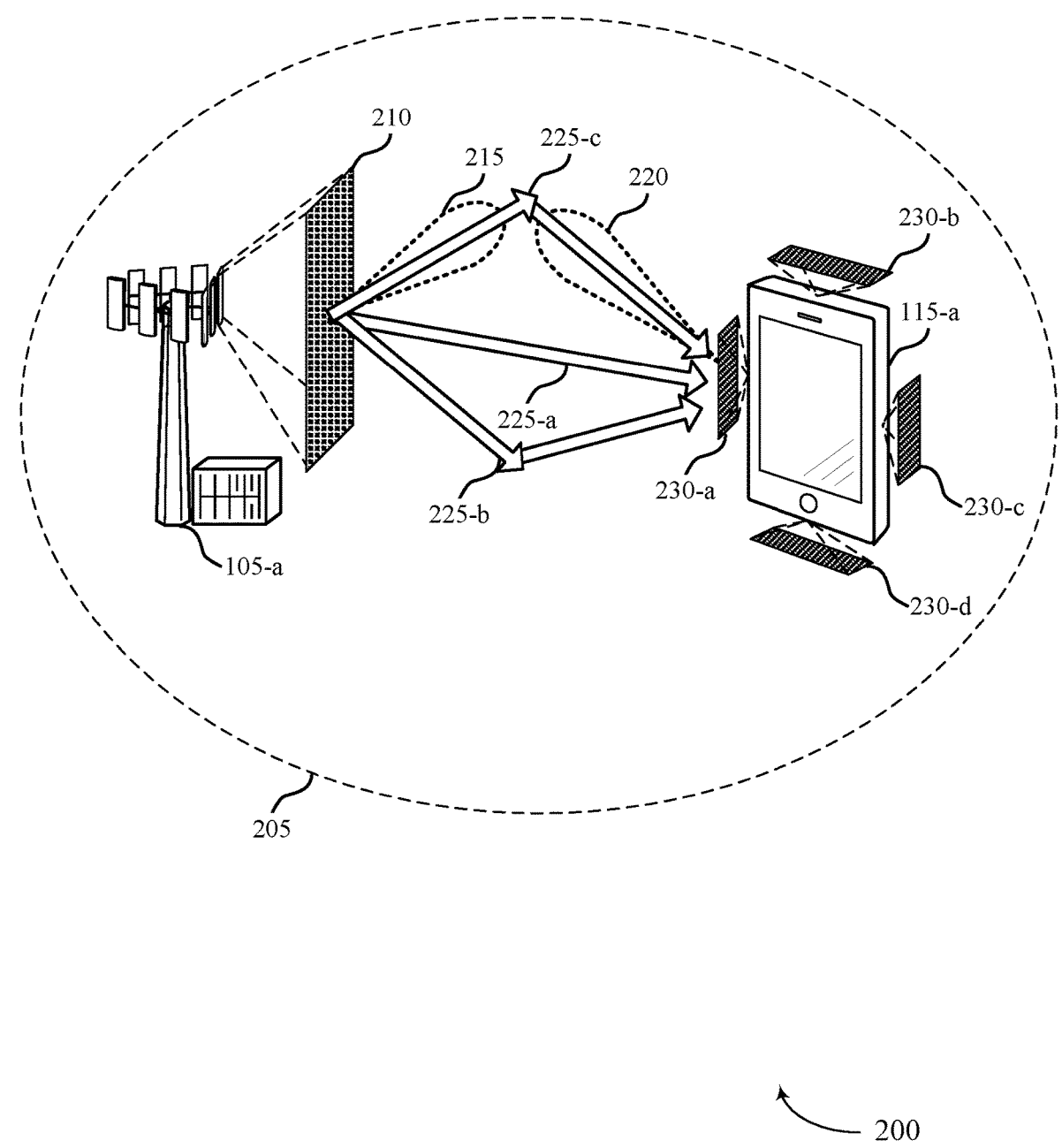
FIG. 2 illustrates an example of a wireless communications system that supports techniques for a UE to request sounding reference signal resources and a base station to convey UE side beam weights in accordance with aspects of the present disclosure.

FIG. 2 illustrates an example of a wireless communications system 200 that supports techniques for a UE to request sounding reference signal resources and a base station to convey UE side beam weights in accordance with aspects of the present disclosure. The wireless communications system 200 may include a base station 105-a and a UE 115-a, which may be examples of a base station 105 and a UE 115 as described with reference to FIG. 1. The base station 105-a may serve a geographic coverage area 205.

The UE 115-a and the base station 105-a may utilize beamforming to communicate over one or more wireless channels. For example, the base station 105-a and the UE 115-a may establish a set of beams (e.g., uplink beams and downlink beams) in support of one or more signaling operations. In some cases, the UE 115-a, the base station 105-a, or both, may determine the established beams do not meet one or more defined metrics (e.g., thresholds) for intended operations. Based on the determination, the UE 115-a and the base station 105-a may improve beamformed communications by performing beam training to realize more robust beamforming communications. It should be noted that, while particular examples of wireless devices are discussed, the techniques discussed below may be implemented to support other wireless devices (e.g., integrated access backhaul (IAB) nodes, consumer premises equipment (CPE), relays, smart repeaters, dumb repeaters, side link nodes, or the like).

The wireless communications system 200 illustrates beamformed communications between the base station 105-a and the UE 115-a. In some examples, the base station 105-a and the UE 115-a may establish a set of beam weights (i.e., beam parameters) such that both devices may communicate beamformed information. For example, the UE 115-a and the base station 105-a may leverage a static or fixed beam codebook to determine and assign beam weights.

In some systems, codebook-based directional beamforming is assumed at both a base station 105 and a UE 115. For example, due to memory and complexity constraints, a fixed analog beamforming codebook may be stored in radio frequency integrated circuit (RFIC) memory at both the base station 105 and the UE 115, where beam training may be performed over the fixed codebook. In some cases, the base station 105 and the UE 115 may perform hierarchical beam training via a P-1, P-2, and P-3 procedure. For example, the base station 105 and the UE 115 may conduct beam selection (e.g., P-1), beam refinement for a transmitter at the base station 105 (e.g., P-2), and beam refinement for a receiver at the UE 115 (e.g., P-3). In particular, downlink beam management (e.g., downlink beam training) may correspond to the base station 105 transmitting beams over SSBs or CSI-RSs with the UE 115 providing a best beam index feedback for the base station 105 to use (e.g., via a transmission configuration indicator (TCI) state update). Similarly, uplink beam management may correspond to the UE 115 transmitting beams over SRSs to the base station 105 with the base station 105 indicating a best beam for the UE 115 to use.

In some cases, P-2 and P-3 beam refinement may utilize $N_t$ reference signals for the UE 115-a side beam estimation and reference signal received power (RSRP) feedback as well as $N_r$ reference signals for the base station 105-a side beam estimation and RSRP feedback. For example, in P-2 and P-3 beam refinement, the base station 105-a may try different beams over $N_t$ symbols. The UE 115-a may receive the symbols via an SSB beam. Based on the symbols, the UE 115-a may report RSRP of the best set of beams. The base station 105-a may receive the report, find the best beam, and thus complete P-2. The UE 115-a may try different beams over $N_r$ symbols. The base station 105-a may receive the symbols via the beam determined via P-2. The base station 105-a may report the RSRP of the best set of beams based on the received symbols to the UE 115-a. Based on the received report, the UE 115-a may determine the best beam, thus completing P-3 beam refinement. In some cases, P-2 beam training may be performed but P-3 beam training may not be performed (or vice versa). In these examples of downlink and uplink beam management, beam indices that are fed back to either the base station 105 or the UE 115 may point to fixed beams used to transmit SSBs, CSI-RS, SRS, or a combination thereof.

Once the set of beam weights are established, the base station 105-a may utilize an antenna array 210 to form a set of beams to communicate with the UE 115-a. In some cases, the base station 105-a may communicate up to $N_t$ symbols via the antenna array 210. Likewise, the UE 115-a may utilize multiple UE antenna arrays 230, which may be capable of communicating $N_r$ symbols, to form a set of beams to communicate with the base station 105-a. For example, the base station 105-a may form an uplink receive beam 215 via the antenna array 210 to enable one or more signaling operations with the UE 115-a. In some cases, multiple arrangements of beams 225 may be available for communications between the base station 105-a and the UE 115-a. Additionally, the multiple arrangements of beams 225 may have different paths between the base station 105-a to the UE 115-a, as illustrated in FIG. 2. For example, a first beam 225-a may excite a first path/cluster in the channel from the antenna array 210 to the UE 115-a. Similarly, a second beam 225-b and a third beam 225-c may excite a second and third path/cluster in the channel, respectively, to the UE 115-b. The first path, the second path, and the third path (or clusters) may differ in various ways (e.g., path length, directivity/directionality, gains, etc.). In some examples, the arrangements of beams 225 may correspond to different beam weight configurations determined from the static or fixed beam codebook. In some cases, the base station 105-a and the UE 115-a may determine, from the arrangements of beams 225, the highest quality beam or set of highest quality beams to utilize for communications. For example, the UE 115-a may measure an RSRP corresponding to beams in the arrangement of the beams 225 to determine the highest quality beam. The base station 105-a may implement beam weights corresponding to the highest quality beam to form the uplink receive beam 215 using the antenna 210. Similarly, the UE 115-a may, in turn, utilize one or more UE antenna arrays 230 to form an uplink transmission beam 220, thereby supporting the UE 115-a to transmit beamformed uplink information to the base station 105-a.

Multiple antennas may be used at the base station 105-a (e.g., gNodeB (gNB)) and the UE 115-a in mmWave systems. Accordingly, beamforming from multiple antennas may be implemented to bridge a link budget between the base station 105-a and the UE 115-a. For example, the UE 115-a may include multiple UE antenna arrays 230 including a first antenna array 230-a, a second antenna array 230-b, a third antenna array 230-c, and a fourth antenna array 230-d. In some examples, the UE 115-a may utilize a selection of available UE antenna arrays 230, all available UE antenna arrays 230, or individual UE antenna arrays 230. For example, the UE 115-a may form an uplink beam to communicate with the base station 105-a using a first UE antenna array 230-a. The base station 105-a may, in turn, utilize the antenna array 210 to form a corresponding uplink receive beam 215, supporting the base station 105-a to receive beamformed uplink information from the UE 115-a. Upon coordinated establishment of uplink beams and downlink beams, the base station 105-a and the UE 115-a may communicate via beamformed signaling.

The wireless communications system 200 may support techniques which provide performance improvement beyond a static or fixed beam codebook. For example, the UE 115-a may transmit reference signals to the base station 105-a for the base station 105-a to perform uplink beam training. Instead of the base station 105-a indicating just the best beam index, the base station 105-a may indicate a set of adaptive beam weights to be used at the UE 115-a. In some examples of these techniques, channel sounding may be leveraged, which may be more efficient when performed on an uplink channel since there may be more antenna resources at the base station 105-a (such as for massive multiple-input and multiple-output (MIMO)) which can reduce the latencies in beam refinement. Further, the base station 105-a may have more computational resources than the UE 115-a which may allow beam refinement to be gainfully performed at the base station 105-a. These techniques may provide greater flexibility in terms of beam weights to be used at the UE 115-a. For example, the UE 115-a may implement the indicated beam weights to use more accurate beams than the beams corresponding to a beam index of a fixed codebook. Aspects of the present disclosure discuss signaling and operations regarding this approach. In some cases, some of these techniques may be implemented in low mobility settings, customer premises equipment (CPE) environments, side link nodes such as other UEs, integrated access and backhaul (IAB) nodes, relay nodes such as repeaters, intelligent reflective surfaces (IRS), reflectarrays, etc., in response to poor performance with static beams, or the like.

In some cases, the UE 115-a or base station 105-a, or both, may determine to perform the uplink beam training at the base station 105-a. For example, UE 115-a may determine to adopt a mode of operation where uplink beam training may be performed at the base station 105-a, where more the uplink beam training is performed at the base station 105-a and adaptive and dynamic beam weights are fed back to the UE 115-a. In some examples, the UE 115-a, the base station 105-a, or both, may determine that established beams do not satisfy a threshold or a level of performance (e.g., signal quality, throughput, etc.), and the UE 115-*a* or the base station 105-*a*, or both, may implement uplink beam training at the base station 105-*a*. For example, one or more aspects of the established beams may degrade such that a triggering condition is satisfied within the UE 115-*a*. For example, a quality for one of the beams may satisfy a threshold, such as the channel quality being below a channel quality threshold. In some examples, the UE 115-*a* may request resources to transmit training symbols. In some cases, the UE 115-*a* may request a number and locations of SRS resources for uplink beam training at the base station 105-*a*. For example, the UE 115-*a* may request $N_r$ SRS resources for beam training. Based on the request, the base station 105-*a* may grant the SRS resources requested by the UE 115-*a*. In some cases, the UE 115-*a* may use more training symbols (e.g., more than $N_r$) to compensate for a poor uplink budget (e.g., via time averaging). In such cases, the UE 115-*a* may indicate antenna dimensions at the UE 115-*a* to the base station 105-*a*. In some cases, the UE 115-*a* may receive a grant for a number of resources greater than $N_r$. In some cases, such as if the UE 115-*a* is granted more than $N_r$ SRS resources, the UE 115-*a* may indicate antenna dimensions at the UE 115-*a* to the base station 105-*a*.

The UE 115-*a* may transmit reference signals on the granted resources to the base station 105-*a*. For example, the UE 115-*a* may transmit training symbols over the granted SRS resources. In some cases, the reference signals may be similar to, or implement aspects of SRS. In some examples, the UE 115-*a* may try different beam weights to transmit the reference signals. For example, the UE 115-*a* may transmit one or more reference signals using a set of multiple beams. The UE 115-*a* may leverage the granted resources by transmitting the training symbols over the SRS resources for uplink beam training at the base station 105-*a*.

The base station 105-*a* may receive the reference signals and determine an uplink receive beam for the base station 105-*a* and an uplink transmit beam for the UE 115-*a*. For example, the base station 105-*a* may estimate the uplink channel based on the reference signals and determine the best beam for the UE 115-*a* based on the uplink channel estimation. The base station 105-*a* may determine the best uplink receive beam at the base station 105-*a* based on the uplink channel estimation or the reference signal measurements, or both. In other words, the base station 105-*a* may utilize the training symbols to estimate the uplink channel and determine the uplink transmission beam 220 and the uplink receive beam 215. In some cases, the base station 105-*a* may estimate the uplink transmission beam 220 weights and the uplink receive beam 215 weights that exhibit the highest quality signaling as determined by the base station 105-*a*. For example, the base station 105-*a* may determine, from the received training symbols, the best beam weights for the uplink receive beam 215 by measuring the RSRP associated with the training symbols. In some cases, the beams with the highest RSRP measurements may be selected.

By implementing these techniques, the wireless communications system 200 may shift a computational burden typically placed on the UE 115-*a* to the base station 105-*a*. For example, the UE 115-*a* may have uplink power constraints relative to downlink beam training. The base station 105-*a* may have more power resources as well as far more radio frequency chains, which may increase the rate of the beam training processes. Further, the UE 115-*a* may transmit $N_r$ training symbols to realize both uplink transmission beam 220 weights and uplink receive beam 215 weights. This may reduce the amount of signaling to determine both uplink and downlink beams, which may provide more efficient resource utilization and reduce power consumption and thermal output at the UE 115-*a*. The UE 115-*a* may use a different set of beamforming vectors to assist the base station 105-*a* with uplink beam training (e.g., instead of antenna selection which may lose array gain in channel estimation).

The base station 105-*a* may transmit an indication of the uplink beam and corresponding beam weights to the UE 115-*a*. In some cases, the base station 105-*a* may indicate the adaptive beam weights to the UE 115-*a* by quantizing the beam weights. For example, the base station 105-*a* may indicate a quantized phase shift level or quantized amplitude level for the UE beam. In some cases, the base station 105-*a* may indicate a set of SRS resource indicators (SRI) to the UE 115-*a* based on the UE 115-*a* uplink training and the beam weights associated with the SRS resources indicated by the SRIs. The UE 115-*a* may implement, or apply, the beam weights for the indicated uplink beam. The UE 115-*a* and the base station 105-*a* may communicate over the established beams based on the uplink training performed at the base station 105-*a*.

Figure 3:
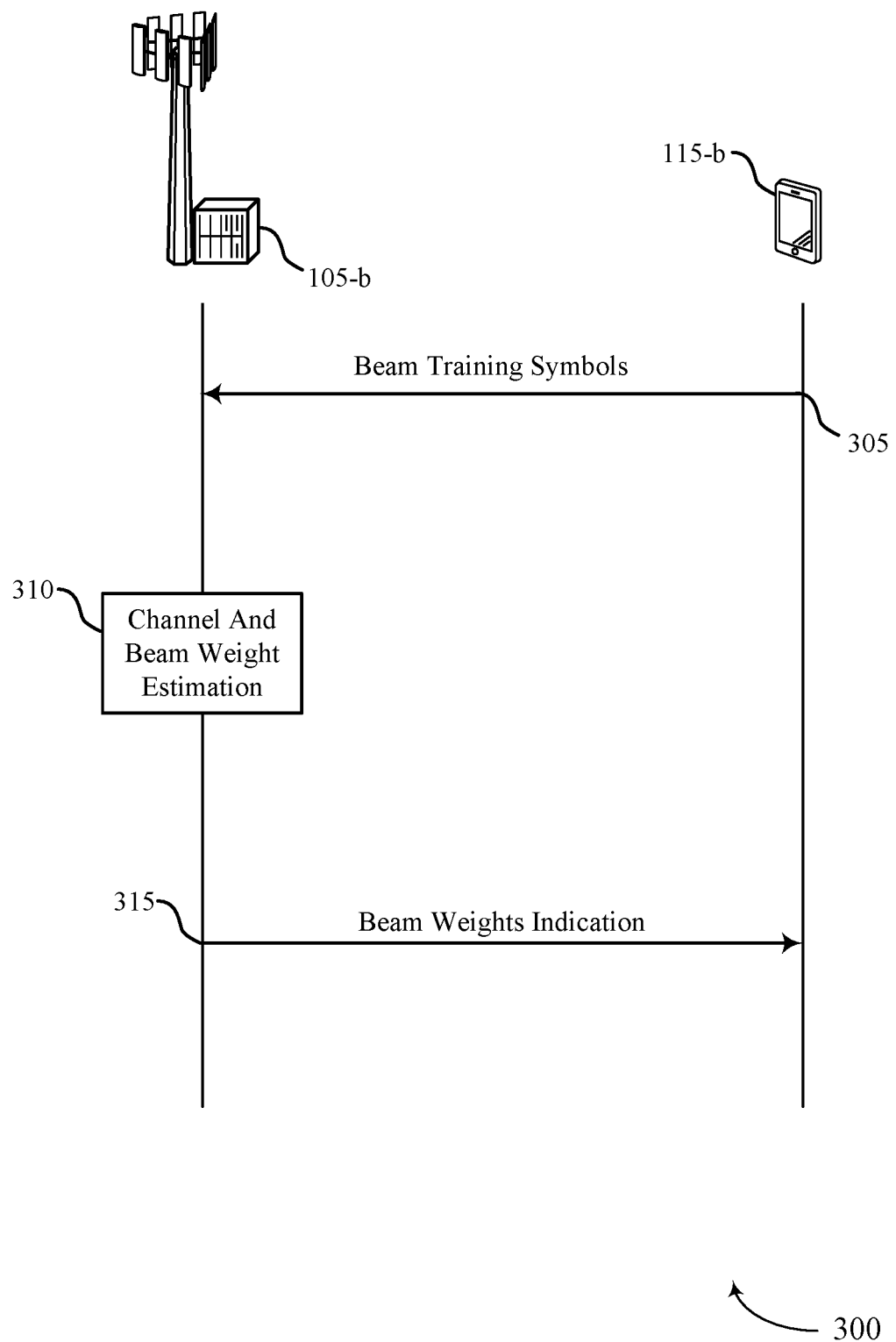
FIG. 3 illustrates an example of a process flow that supports techniques for a UE to request sounding reference signal resources and a base station to convey UE side beam weights in accordance with aspects of the present disclosure.

FIG. 3 illustrates an example of a process flow 300 that supports techniques for a UE to request sounding reference signal resources and a base station to convey UE side beam weights in accordance with aspects of the present disclosure. The process flow 300 may include a base station 105-*b* and a UE 115-*b*, which may be examples of a base station 105 and a UE 115 as described with reference to FIG. 1. In some examples, the process flow 300 may include one or more operations, signals, and procedures associated with the base station 105-*b* and the UE 115-*b*, which may be examples of those discussed with reference to FIGS. 1-2. While specific signaling operations may be discussed below, the signaling operations between various devices may be performed in a different order than the example order shown, or the operations performed by the devices may be performed by different devices or at different times. Some operations may also be omitted from the process flow 300, and other operations may be added to the process flow 300.

The base station 105-*b* and the UE 115-*b* may establish a set of beams for wireless communications. In some examples, the base station 105-*b*, using mmWave communications, may implement a set of adaptive beam weights to one or more internal antenna arrays to establish a downlink transmission beam and an uplink receive beam. Accordingly, the UE 115-*b* may implement a set of beam weights to one or more internal UE antenna arrays to establish a downlink receive beam and an uplink transmission beam, where the set of beam weights corresponding to both devices are coordinated such that both device may exchange information via uplink beams and downlink beams (e.g., coordinated beam directivity, beam widths, working frequencies, etc.). In some cases, multiple antenna arrays may be used at the base station 105-*b* and the UE 115-*b*.

In some examples, one or more signaling metrics or signaling qualities may satisfy a triggering condition at the UE 115-*b* (e.g., a demand for performance improvement beyond the static or fixed beam codebook in low mobility settings, CPE use-cases, IAB nodes, side link nodes, assistive nodes, poor performance with static beams, etc.). The UE 115-*b* may request $N_r$ training symbol resources from the base station 105-*b*. In response, the base station 105-*b* may grant the set of SRS resources requested by the UE 115-*b*. In some examples, UE 115-*b* may receive $N_r$ SRS resources with corresponding beamforming vectors $g_1, \ldots, g_{N_r}$ to signal to the base station 105-*b*. For example, UE 115-*b* may use beamforming vector of $g_i = [0 \ldots 0\ 1\ 0 \ldots 0]^T$, where 1 is the i'th position. It is to be understood that other choices of beamforming vectors are not precluded given the previous example.

At 305, the UE 115-b may transmit a set of beam training symbols over the granted set of SRS resources utilizing the corresponding beamforming vectors. The UE 115-b may try different beams utilizing an internal antenna supporting $N_r$ symbols.

The base station 105-b may receive the set of beam training symbols. In some cases, the base station 105-a may receive an indication of the dimensions of the one or more internal UE antenna arrays. At 310, the base station 105-b may determine an uplink receive beam for the base station 105-b and an uplink transmit beam for the UE 115-b. In some examples, the base station 105-b may determine a best set of adaptive beam weights indicated in the set of beam training symbols generated by the UE 115-b. For example, the base station 105-b may perform uplink channel estimation and determine the base station beam for the base station 105-b. Based on the uplink channel estimation and the base station beam, the base station 105-b may determine beam weights for the UE side beam for the UE 115-b.

In some cases, the base station may utilize the dimensions of the one or more internal UE antenna arrays, the dimensions of the antenna array at the base station 105-b (e.g., $N_t$), and the received beam training symbols $g_1, \ldots, g_{N_r}$ to estimate a channel matrix and, therefore, adaptive beam weights corresponding to a best beam within the set of beam training symbols. A set of uplink receive vectors may be modeled according to Equation 1 below, where $H^T$ is an $N_t \times N_r$ (e.g., base station antenna array dimension×UE antenna array dimension) channel matrix, $n_{UL,i}$ is uplink noise corresponding to the i'th symbol reception, and s is a coefficient characterizing the set of uplink receive vectors. Given the channel matrix dimensions, the UE 115-b may not request less than $N_r$ SRS resources. In some cases, if the UE requests fewer resources, there may be a lower likelihood of an accurate estimate for the beams or channel matrix.

$$y_{UL,i} = H^T g_i s + n_{UL,i}, \text{ where } H = \begin{bmatrix} h_1 \\ \vdots \\ h_{N_r} \end{bmatrix} \quad (1)$$

For comparison, a set of downlink receive beams including received beam training symbols $f_1, \ldots, f_{N_r}$ at the UE 115-b may be defined. Equation 2 below illustrates the set of downlink receive vectors at the UE 115-b, where H is an $N_r \times N_t$ channel matrix, $n_{DL,i}$ is downlink noise corresponding to i'th symbol reception on downlink, and s is a coefficient characterizing the set of downlink receive vectors.

$$y_{DL,i} = H f_i s + n_{DL,i} \quad (2)$$

Based on the set of uplink receive vectors modeled by Equation 1, the base station 105-b may reconstruct $\hat{H}$ according to Equation 3, as below.

$$\hat{H} = \begin{bmatrix} y_{UL,1}^T \\ \vdots \\ y_{UL,N_r}^T \end{bmatrix} \quad (3)$$

The base station 105-b may use $\hat{H}$ to derive the set of adaptive beam weights corresponding to the best beam for the UE 115-b to utilize for the uplink transmission beam. Further, the base station 105-b may perform one or more mathematical operations on $\hat{H}$ to estimate the set of adaptive beam weights corresponding to a best beam for the base station 105-b to utilize for the uplink receive beam.

For example, the base station 105-b may perform a singular value decomposition to obtain the dominant right singular vector of $\hat{H}$, which may correspond to a beamforming vector at the base station 105-b corresponding to the best beam to utilize for the uplink receive beam. The base station 105-b may then establish the structure of the beam (e.g., a dynamic set of uplink beam weights) the UE 115-b may use, which may be the matched filter. In some cases, the structure of the beam at the UE 115-b may be determined in accordance with Equation 4, where $f_{gNB,dyn}$ are dynamic beam weights to use at the base station 105-b.

$$g_{UL,dyn} = \frac{\hat{H} f_{gNB,dyn}}{\|\hat{H} f_{gNB,dyn}\|} \quad (4)$$

Additionally or alternatively, the base station 105-b may use approaches such as beamforming vector construction to minimize minimum mean squared error (MMSE), regularized MMSE, or the like for channel reconstruction, where the aforementioned approaches may trade off complexity for a higher quality channel estimate.

In some cases, techniques for downlink beam training in other systems may not provide for a base station 105 to determine dynamic beam weights (e.g., $f_{gNB,dyn}$) to use for forming an uplink receive beam. Instead, these techniques of other systems provide for the base station 105-b to pick the beam from a training set based on the feedback from the UE 115-b. In contrast, as discussed earlier, the uplink beam training approach described herein provides for the base station 105-b to determine both the uplink transmission beam and the uplink receive beam (e.g., both $f_{gNB,dyn}$ and $g_{UE,dyn}$). This dual beam training can lead to far more significant performance improvement instead of dynamic beam weight usage solely at the UE 115-b. In many cases, the dynamic weight usage solely at the UE 115-b may consume significant UE power resources. Based on the dual beam training, the base station 105-b may quantize the set of adaptive beam weights corresponding to the best beam for the UE 115-b to utilize for the uplink transmission beam (e.g., as phase shift levels or amplitude).

At 315, the base station 105-b may transmit an indication of beam weights to the UE 115-b. For example, the base station 105-b may indicate set of adaptive beam weights determined by the base station 105-b. In some cases, the base station 105-b may transmit the indication of the set of adaptive beam weights (e.g., quantized phase shifter levels or quantized amplitude levels) via RRC signaling, a downlink control information (DCI) message, or the like.

Figure 4:
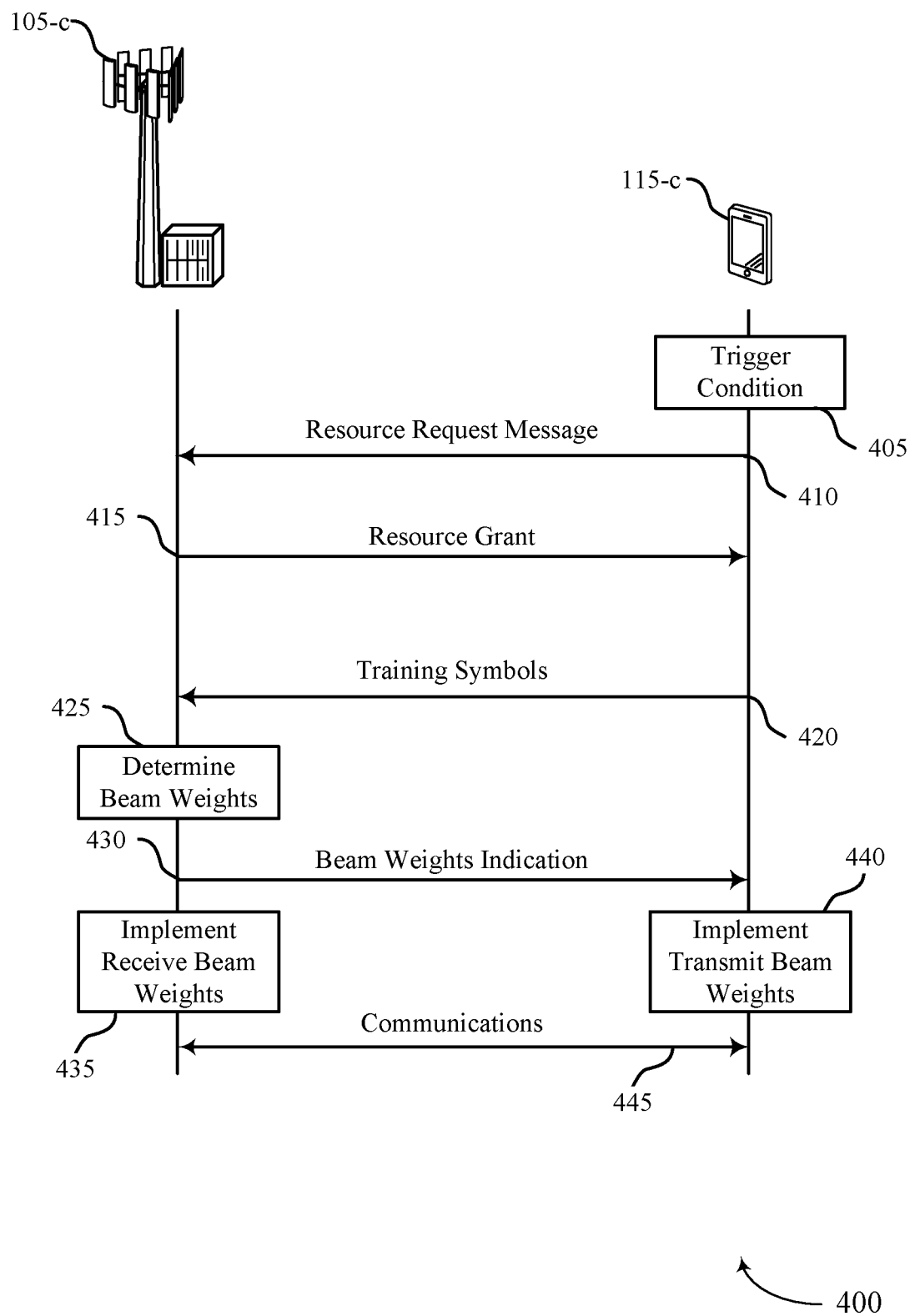
FIG. 4 illustrates an example of a process flow that supports techniques for a UE to request sounding reference signal resources and a base station to convey UE side beam weights in accordance with aspects of the present disclosure.

FIG. 4 illustrates an example of a process flow 400 that supports techniques for a UE to request sounding reference signal resources and a base station to convey UE side beam weights in accordance with aspects of the present disclosure. The process flow 400 may include a base station 105-c and a UE 115-c, which may be examples of a base station 105 and a UE 115 as described with reference to FIG. 1. In some examples, the process flow 400 may include one or more operations, signals, and procedures associated with the base station 105-c and the UE 115-c, which may be examples of corresponding operations discussed with reference to FIGS. 1-3. While specific signaling operations may be discussed below, the signaling operations between various devices may be performed in a different order than the example order shown, or the operations performed by the devices may be performed by different devices (e.g., IAB nodes, CPE devices, relay nodes, smart repeaters, dumb repeaters, side link nodes, transmission reception points (TRxPs), or the like) or at different times. Some operations may also be omitted from the process flow 400, and other operations may be added to the process flow 400.

In some cases, at 405, the UE 115-c may determine that a trigger condition is satisfied by one or more parameters, use-cases, thresholds, or the like. For example, the UE 115-c may determine that static or fixed beam codebook parameters assigned for beamforming communications with the base station 105-c have fallen below a signal quality threshold. For example, the UE 115-c may determine that a channel quality for a fixed beam associated with a fixed codebook fails to satisfy a threshold channel quality. Additionally or alternatively, the UE 115-c may determine to adopt a mode of operation where uplink beam training may be performed at the base station 105-c. In this mode of operation, beam weights corresponding to the uplink beam are determined dynamically by the base station 105-c and indicated (e.g., fed back) to the UE 115-c as opposed to relying on other forms of beam training (e.g., the UE 115-c awaiting P-2 and P-3 downlink beam refinement at the base station 105-c side or analogous U-3 and U-2 beam refinement on the UE 115-c side.).

At 410, the UE 115-c may transmit a resource request message requesting uplink reference signal resources for a beam training procedure to the base station 105-c. In some cases, the resource request message may be transmitted based on the trigger condition at 405. The resource request message received by the base station 105-c may include a number of resources or a time-frequency resource location within a resource block grid for the reference signals. In some cases, the base station 105-c may determine or identify uplink reference signal resources for a beam training procedure based on the request. In some instances, the number of resources may be based on an uplink link budget (e.g., the number of requested SRS opportunities could be a function of uplink budget, number of antennas at the UE 115-c, the base station 105-c, or both, or the number of radio frequency chains at the UE 115-c, the base station 105-c, or both), a first number of antennas at the UE 115-c (e.g., corresponding to $N_r$), a second number of antennas at the base station 105-c (e.g., corresponding to $N_t$), a first number of radio frequency transmit/receive chains at the UE 115-c, a second number of radio frequency transmit/receive chains at the base station 105-c, or any combination thereof. In some cases, the UE 115-c may transmit the request in response to the channel quality failing to satisfy the threshold channel quality. In some examples, the communications may be signaled in a frequency range such as frequency range 2, frequency range 4, or frequency range 5).

For example, the UE 115-c may request a set of SRS resources to utilize for beam training, as discussed with reference to FIGS. 2 and 3. The base station 105-c may receive the request and respond by transmitting a resource grant at 415 to the UE 115-c granting the set of SRS resources. In some examples, the base station 105-c may transmit control signaling to identify the uplink reference signal resources for the beam training procedure. In some cases, the uplink reference signal resources granted by the base station 105-c may be contiguous in a time domain or a frequency domain.

Upon receipt of the indication of the granted resources, the UE 115-c may begin beam training utilizing the identified uplink reference signal resources. In some cases, the UE 115-c may transmit, and the base station 105-c may receive, an indication of an antenna array configuration at the UE 115-c. In some examples, the indication of the antenna array configuration may be transmitted based on the received control signaling identifying one or more uplink reference signal resources corresponding to supported beamforming vectors at the UE 115-c. Accordingly, the reference signals may be transmitted on a set of beams according to the antenna array configuration.

At 420, the UE 115-c may transmit a set of training symbols to the base station 105-c. For example, the UE 115-c may transmit, using a set of multiple beams, reference signals on the identified uplink reference signal resources. in some cases, the set of training symbols, or reference signals, may correspond to dimensions of one or more antenna arrays internal to the UE 115-c. For example, the UE 115-c may transmit $N_r$ training symbols on a set of beams on the identified uplink reference signal resources, where $N_r$ may also correspond to the dimensions of the one or more antenna arrays internal to the UE 115-c. In some cases, the reference signals, or training symbols, may be an example of implement aspects of SRS.

Based on the operations above, the base station 105-c may receive the reference signals on the identified uplink reference signal resources transmitted by the set of beams. In some cases, base station 105-c may receive the reference signals on the reference signal resources indicated via the grant transmitted by the base station 105-c.

At 425, the base station 105-c may determine adaptive beam weights. for example, the base station 105-c may determine a first set of beam parameters for the beam to be used at the UE and a second set of beam parameters for the beam based on the received reference signals. For example, the base station 105-c may determine beam weights for a UE-side beam and a base station-side beam based the set of beam training symbols, the dimensions of one or more antenna arrays at the UE 115-c, or both. The base station 105-c may estimate adaptive beam weights for both an uplink transmission beam for the UE 115-c as well as a corresponding uplink receive beam for use at the base station 105-c, as discussed previously with reference to FIG. 3. The base station 105-c may quantize the adaptive beam weights corresponding to the uplink transmission beam for transmission to the UE 115-c. In some cases, the base station 105-c may quantize the adaptive beam weights corresponding to the uplink receive beam for implementation at an antenna array internal to the base station 105-c.

At 430, the base station 105-c may transmit in an indication of beam parameters for the beam to be used at UE 115-c. For example, the base station 105-c may indicate beam weights to the UE 115-c for an uplink transmission beam. The indication of the adaptive beam weights may correspond to a best beam candidate determined by the base station 105-c based on the set of beam training symbols (e.g., the set of SRS resources) transmitted by the UE 115-c.

For example, the base station 105-c may transmit, and the UE 115-c may receive, an indication of the adaptive beam weights. The base station 105-c may transmit the indication in a DCI message, RRC signaling, a medium access control-control element (MAC-CE), or some combination thereof. In some cases, the base station 105-c may transmit an indication of the adaptive beam weights as a phase shift, amplitude, or both, for the beam. The UE 115-c may receive the indication of the adaptive beam weights and utilize the phase shift, the amplitude, or both to communicate with the base station 105-c using the indicated beam. In some cases, the UE 115-c may receive an indication of a set of SRIs and a corresponding set of beam weights for the set of SRIs. By shifting the computational and thermal burden to the base station 105-*c* for beam training, the UE 115-*c* may save power resources while reducing overall signaling overhead between the UE 115-*c* and the base station 105-*c*.

Accordingly, at 435, the base station 105-*c* may implement the adaptive beam weights corresponding to the uplink receive beam on the antenna array internal to the base station 105-*c* based on an indication of the adaptive beam weights. Correspondingly, at 440, the UE 115-*c* may implement the adaptive beam weights for the uplink transmission beam based on an indication of the adaptive beam weights transmitted by the base station 105-*c* on the one or more antenna arrays internal to the UE 115-*c*.

For example, the base station 105-*c* and the UE 115-*c* may assign quantized phase shift levels to respective antenna arrays internal to both the base station 105-*c* and the UE 115-*c* in preparation to utilize the set of adaptive beam weights determined via the beam training conducted at the base station 105-*c*. At 445, the base station 105-*c* and the UE 115-*c* may communicate over the uplink transmission beam and the uplink receive beam according to the adaptive beam weights estimated at the base station 105-*c*.

Figure 5:
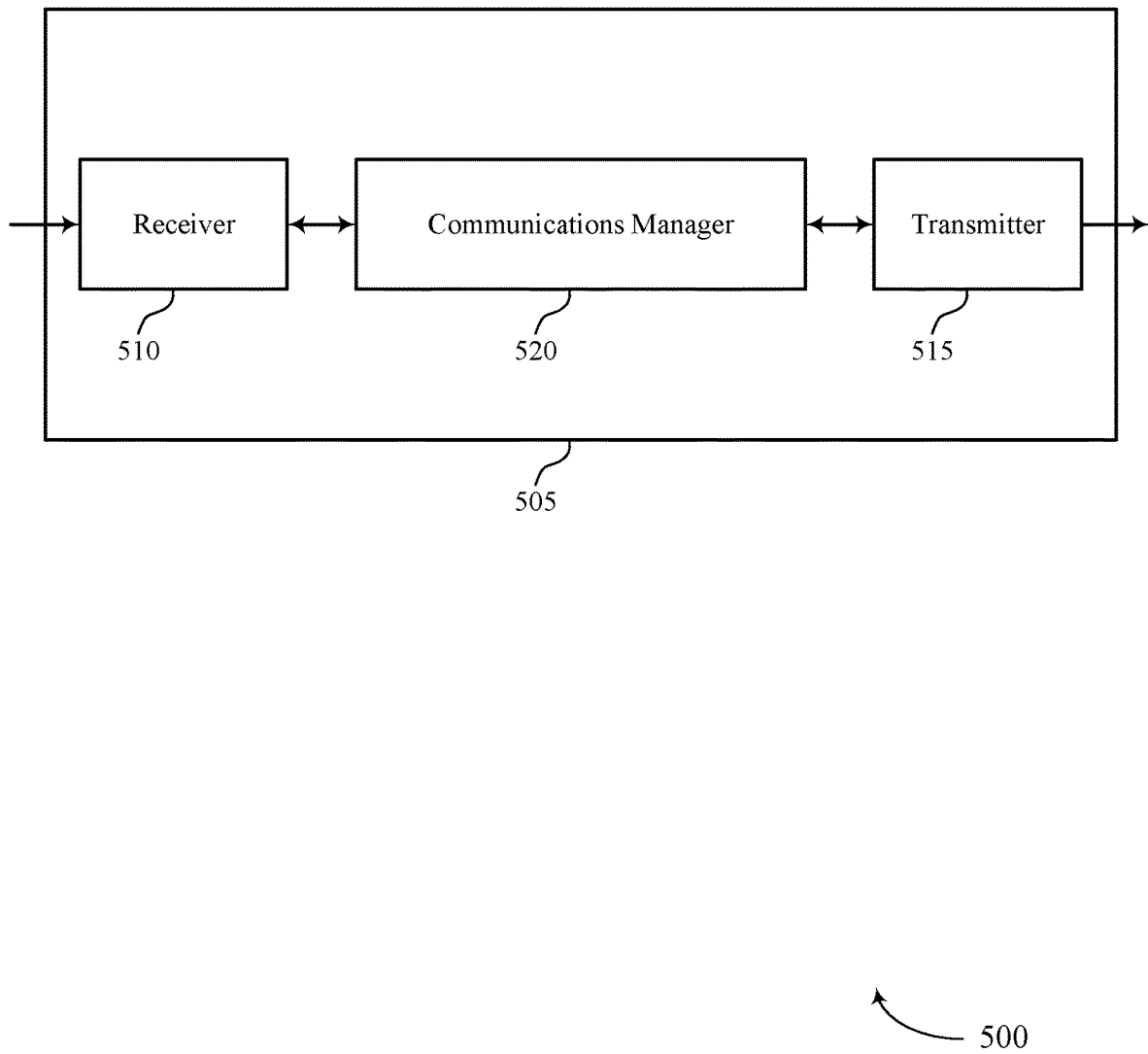
FIGS. 5 and 6 show block diagrams of devices that support techniques for a UE to request sounding reference signal resources and a base station to convey UE side beam weights in accordance with aspects of the present disclosure.

FIG. 5 shows a block diagram 500 of a device 505 that supports techniques for a UE to request sounding reference signal resources and a base station to convey UE side beam weights in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for a UE to request sounding reference signal resources and a base station to convey UE side beam weights). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for a UE to request sounding reference signal resources and a base station to convey UE side beam weights). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for a UE to request sounding reference signal resources and a base station to convey UE side beam weights as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting, to a base station, a request for uplink reference signal resources for a beam training procedure. The communications manager 520 may be configured as or otherwise support a means for receiving, in response to the transmitted request, control signaling identifying the uplink reference signal resources for the beam training procedure. The communications manager 520 may be configured as or otherwise support a means for transmitting, using a set of multiple beams, reference signals on the identified uplink reference signal resources. The communications manager 520 may be configured as or otherwise support a means for receiving, in response to the transmitted reference signals, an indication of beam parameters for a beam at the UE. The communications manager 520 may be configured as or otherwise support a means for communicating with the base station using the beam at the UE according to the beam parameters.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption at a UE 115. By performing uplink beam training at a base station 105 instead of at a UE 115, the UE 115 may conserve power resources.

Figure 6:
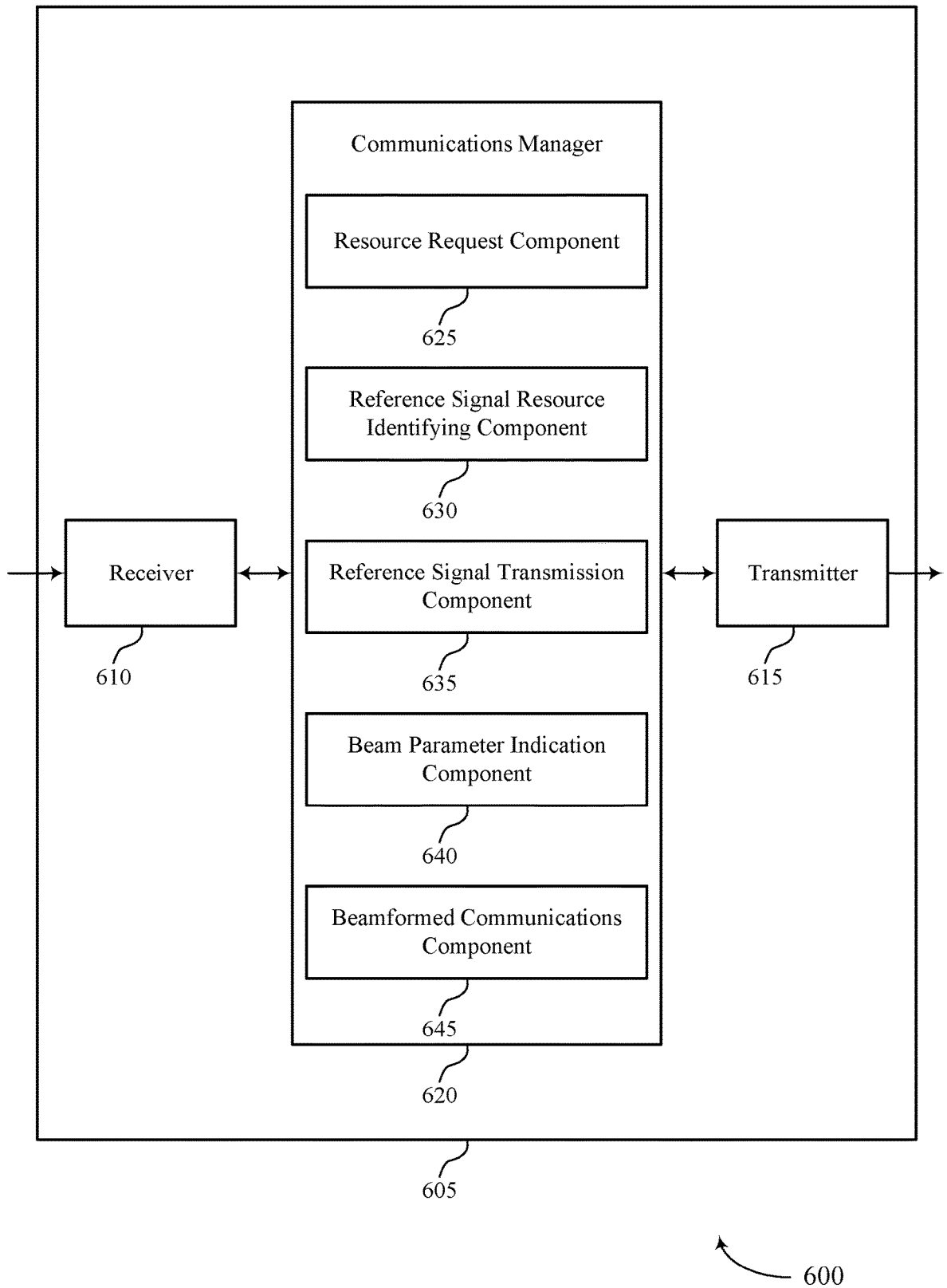

FIG. 6 shows a block diagram 600 of a device 605 that supports techniques for a UE to request sounding reference signal resources and a base station to convey UE side beam weights in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for a UE to request sounding reference signal resources and a base station to convey UE side beam weights). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for a UE to request sounding reference signal resources and a base station to convey UE side beam weights). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for a UE to request sounding reference signal resources and a base station to convey UE side beam weights as described herein. For example, the communications manager 620 may include a resource request component 625, a reference signal resource identifying component 630, a reference signal transmission component 635, a beam parameter indication component 640, a beamformed communications component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The resource request component 625 may be configured as or otherwise support a means for transmitting, to a base station, a request for uplink reference signal resources for a beam training procedure. The reference signal resource identifying component 630 may be configured as or otherwise support a means for receiving, in response to the transmitted request, control signaling identifying the uplink reference signal resources for the beam training procedure. The reference signal transmission component 635 may be configured as or otherwise support a means for transmitting, using a set of multiple beams, reference signals on the identified uplink reference signal resources. The beam parameter indication component 640 may be configured as or otherwise support a means for receiving, in response to the transmitted reference signals, an indication of beam parameters for a beam at the UE. The beamformed communications component 645 may be configured as or otherwise support a means for communicating with the base station using the beam at the UE according to the beam parameters.

Figure 7:
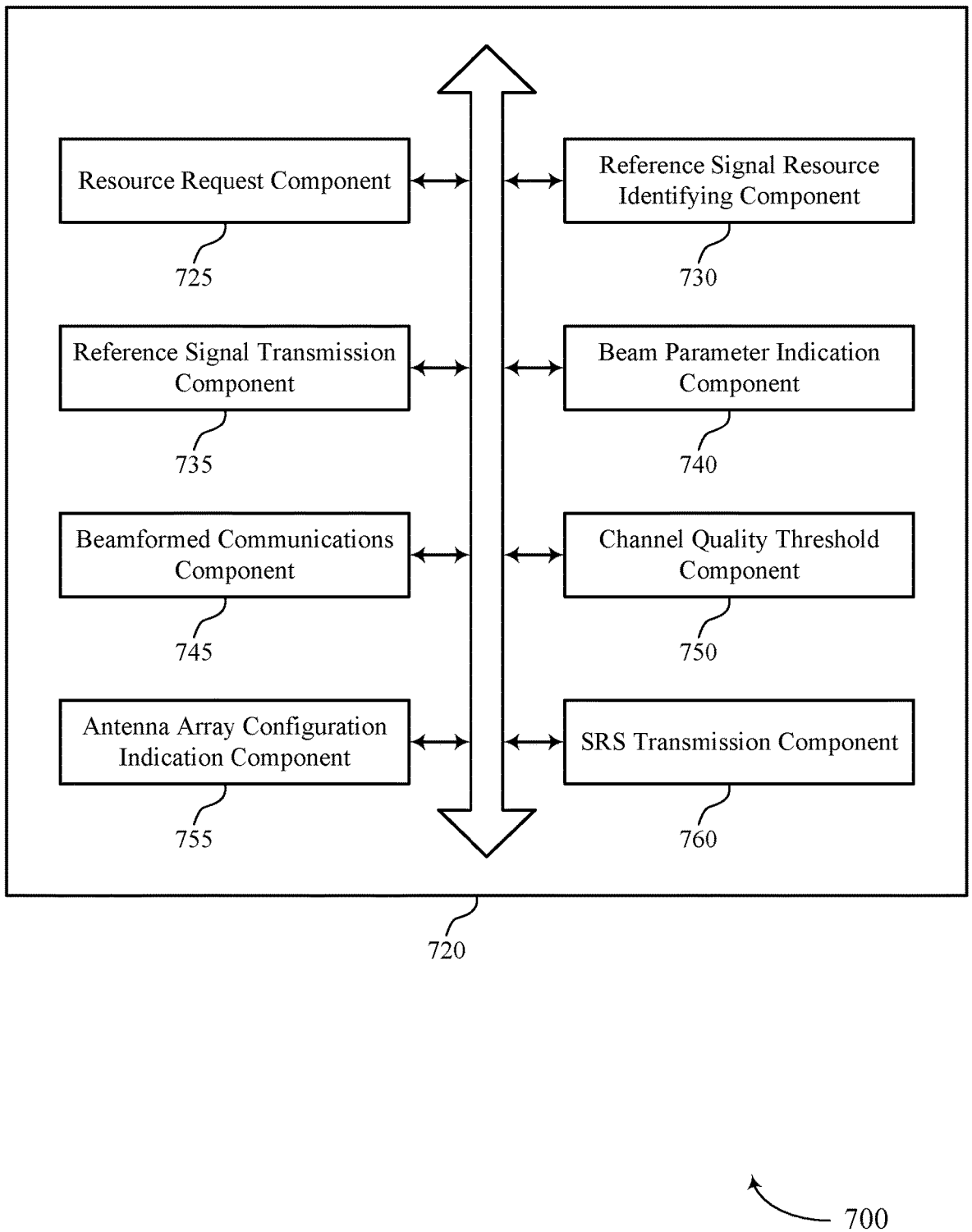
FIG. 7 shows a block diagram of a communications manager that supports techniques for a UE to request sounding reference signal resources and a base station to convey UE side beam weights in accordance with aspects of the present disclosure.

FIG. 7 shows a block diagram 700 of a communications manager 720 that supports techniques for a UE to request sounding reference signal resources and a base station to convey UE side beam weights in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for a UE to request sounding reference signal resources and a base station to convey UE side beam weights as described herein. For example, the communications manager 720 may include a resource request component 725, a reference signal resource identifying component 730, a reference signal transmission component 735, a beam parameter indication component 740, a beamformed communications component 745, a channel quality threshold component 750, an antenna array configuration indication component 755, an SRS transmission component 760, or any combination thereof. Each of these components may communicate, directly or indirectly, with one another (e.g., via one or more buses).

The communications manager 720 may support wireless communications at a UE in accordance with examples as disclosed herein. The resource request component 725 may be configured as or otherwise support a means for transmitting, to a base station, a request for uplink reference signal resources for a beam training procedure. The reference signal resource identifying component 730 may be configured as or otherwise support a means for receiving, in response to the transmitted request, control signaling identifying the uplink reference signal resources for the beam training procedure. The reference signal transmission component 735 may be configured as or otherwise support a means for transmitting, using a set of multiple beams, reference signals on the identified uplink reference signal resources. The beam parameter indication component 740 may be configured as or otherwise support a means for receiving, in response to the transmitted reference signals, an indication of beam parameters for a beam at the UE. The beamformed communications component 745 may be configured as or otherwise support a means for communicating with the base station using the beam at the UE according to the beam parameters.

In some examples, to support receiving the indication of the beam parameters, the beam parameter indication component 740 may be configured as or otherwise support a means for receiving an indication of a phase shift or an amplitude, or both, for the beam at the UE, where communicating with the base station using the beam at the UE is based on the phase shift or the amplitude, or both.

In some examples, to support receiving the indication of the beam parameters for the beam at the UE, the beam parameter indication component 740 may be configured as or otherwise support a means for receiving an indication of a set of adaptive beam weights, where the set of adaptive beam weights are for the beam at the UE, or one or more beams of the base station, or both, and where communicating with the base station is based on the set of adaptive beam weights.

In some examples, to support receiving the indication of the beam parameters, the beam parameter indication component 740 may be configured as or otherwise support a means for receiving an indication of a set of sounding reference signal resource indicators and a corresponding set of beam weights for the set of sounding reference signal resource indicators, where the reference signals are transmitted based on the set of sounding reference signal resource indicators.

In some examples, to support transmitting the request for the uplink reference signal resources, the resource request component 725 may be configured as or otherwise support a means for transmitting the request including a number of resources or a time-frequency assignment within the resource block grid for the reference signals, where the control signaling identifies the uplink reference signal resources based on the number of resources and the time-frequency assignment request.

In some examples, the number of resources is based on an uplink link budget, a first number of antennas at the UE, a second number of antennas at the base station, a first number of radio frequency transmit/receive chains at the UE, a second number of radio frequency transmit/receive chains at the base station, or any combination thereof.

In some examples, the channel quality threshold component 750 may be configured as or otherwise support a means for determining that a channel quality for a fixed beam associated with a fixed codebook fails to satisfy a threshold channel quality, the request transmitted in response to the channel quality failing to satisfy the threshold channel quality.

In some examples, the antenna array configuration indication component 755 may be configured as or otherwise support a means for transmitting, to the base station, an indication of an antenna array configuration at the UE, where the reference signals are transmitted on the set of multiple beams according to the antenna array configuration.

In some examples, the indication of the antenna array configuration is transmitted based on the received control signaling identifying more uplink reference signal resources than supported beamforming vectors at the UE.

In some examples, to support transmitting the uplink reference signals, the SRS transmission component 760 may be configured as or otherwise support a means for transmitting sounding reference signals on the set of multiple beams on the identified uplink reference signal resources.

In some examples, to support receiving the indication of the beam parameters, the beam parameter indication component 740 may be configured as or otherwise support a means for receiving a DCI message or RRC signaling or medium access control-control element (MAC-CE) indicating the beam parameters.

In some examples, the uplink reference signal resources are contiguous in a time domain or a frequency domain.

Figure 8:
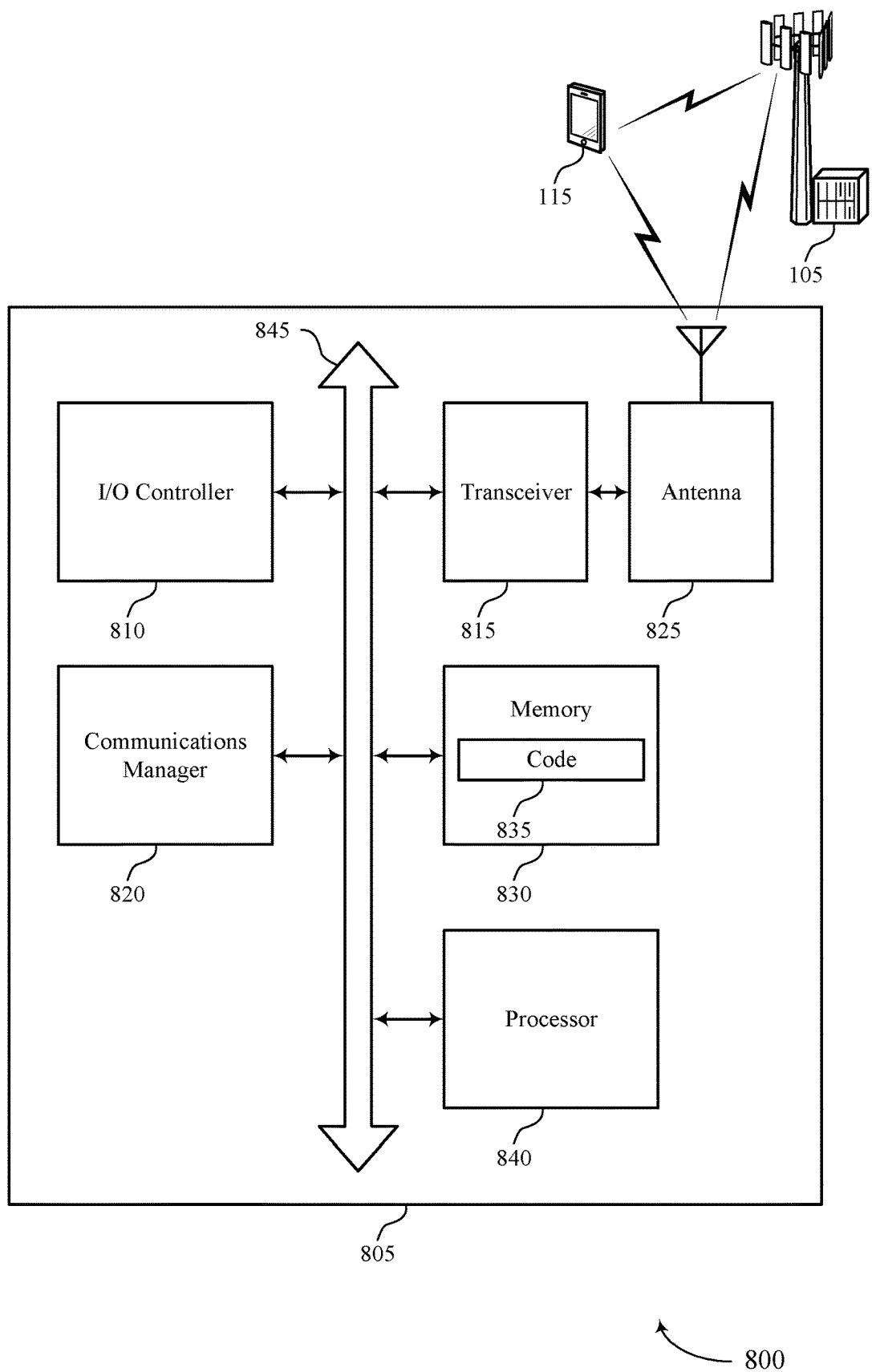
FIG. 8 shows a diagram of a system including a device that supports techniques for a UE to request sounding reference signal resources and a base station to convey UE side beam weights in accordance with aspects of the present disclosure.

FIG. 8 shows a diagram of a system 800 including a device 805 that supports techniques for a UE to request sounding reference signal resources and a base station to convey UE side beam weights in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for a UE to request sounding reference signal resources and a base station to convey UE side beam weights). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting, to a base station, a request for uplink reference signal resources for a beam training procedure. The communications manager 820 may be configured as or otherwise support a means for receiving, in response to the transmitted request, control signaling identifying the uplink reference signal resources for the beam training procedure. The communications manager 820 may be configured as or otherwise support a means for transmitting, using a set of multiple beams, reference signals on the identified uplink reference signal resources. The communications manager 820 may be configured as or otherwise support a means for receiving, in response to the transmitted reference signals, an indication of beam parameters for a beam at the UE. The communications manager 820 may be configured as or otherwise support a means for communicating with the base station using the beam at the UE according to the beam parameters.

By including or configuring the communications manager 820 in accordance with examples as described herein, the device 805 may support techniques for improved communications reliability. By performing uplink beam training at a base station 105 and indicating adaptive beam weights to a UE 115 for a beam, the UE 115 and the base station 105 may communicate using higher quality beams.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for a UE to request sounding reference signal resources and a base station to convey UE side beam weights as described herein, or the processor 840 and the memory 830 may be otherwise configured to perform or support such operations.

Figure 9:
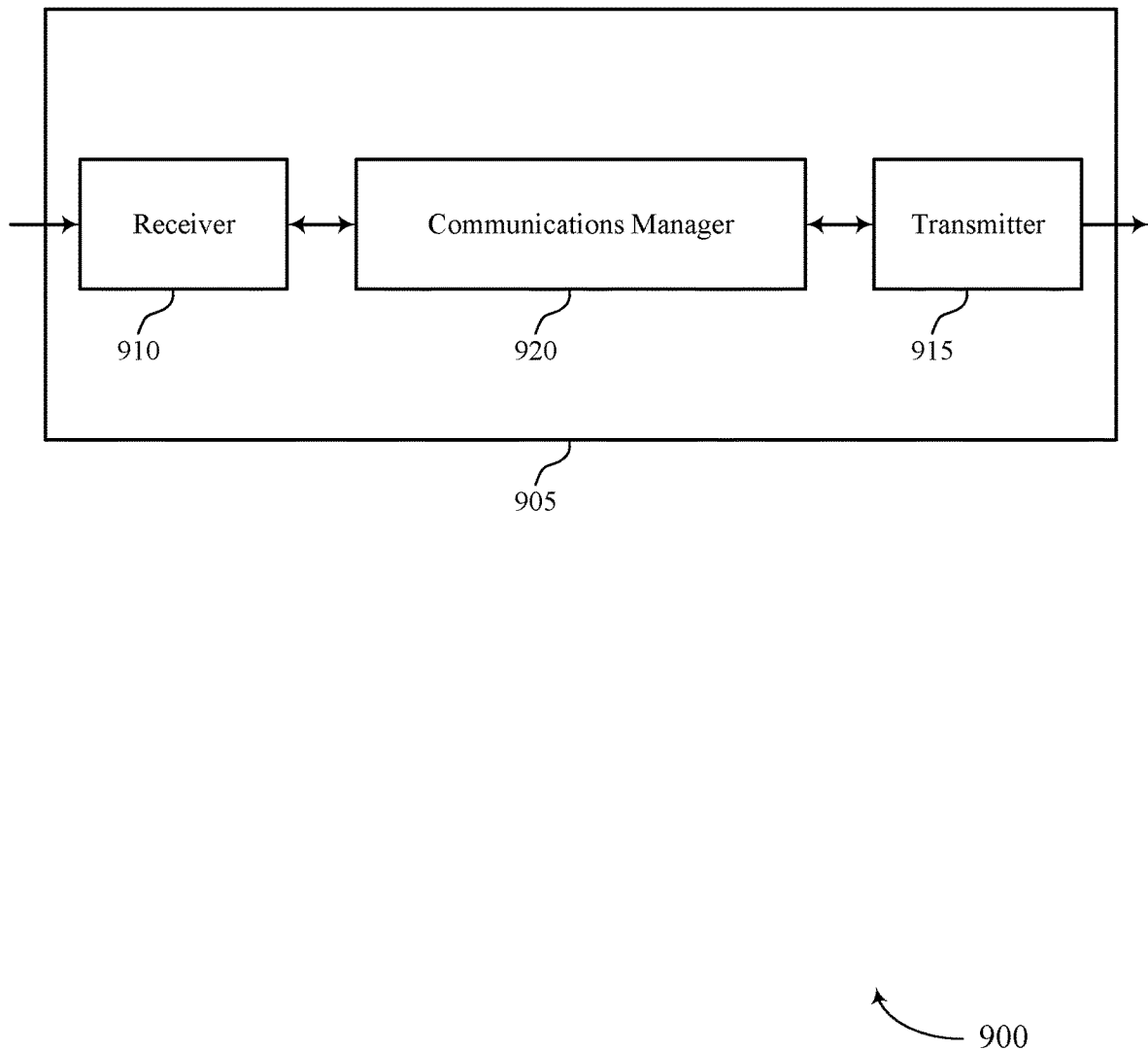
FIGS. 9 and 10 show block diagrams of devices that support techniques for a UE to request sounding reference signal resources and a base station to convey UE side beam weights in accordance with aspects of the present disclosure.

FIG. 9 shows a block diagram 900 of a device 905 that supports techniques for a UE to request sounding reference signal resources and a base station to convey UE side beam weights in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for a UE to request sounding reference signal resources and a base station to convey UE side beam weights). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for a UE to request sounding reference signal resources and a base station to convey UE side beam weights). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for a UE to request sounding reference signal resources and a base station to convey UE side beam weights as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, a request for uplink reference signal resources for a beam training procedure. The communications manager 920 may be configured as or otherwise support a means for transmitting, in response to the received request, control signaling indicating the uplink reference signal resources for the beam training procedure. The communications manager 920 may be configured as or otherwise support a means for receiving reference signals on the identified uplink reference signal resources transmitted by a set of multiple beams. The communications manager 920 may be configured as or otherwise support a means for transmitting, in response to the received reference signals, an indication of beam parameters for a beam to be used at the UE. The communications manager 920 may be configured as or otherwise support a means for communicating with the UE using a beam and the beam according to the beam parameters transmitted to the UE.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for more efficient power resource utilization. For example, by performing uplink beam training at a base station 105 instead of at a UE 115, the UE 115 may conserve power resources. In some cases, the base station 105 may have greater power resource availability.

Figure 10:
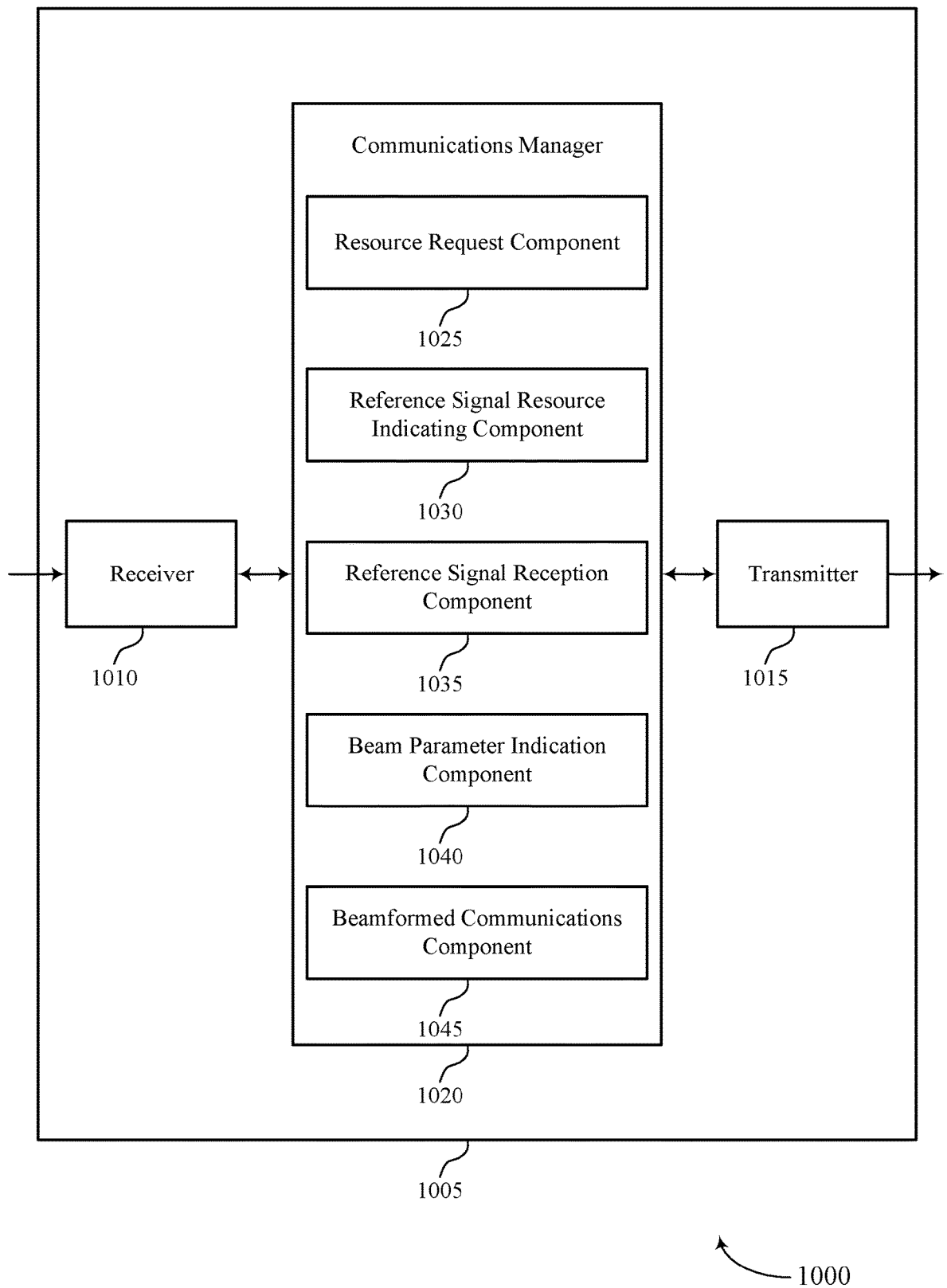

FIG. 10 shows a block diagram 1000 of a device 1005 that supports techniques for a UE to request sounding reference signal resources and a base station to convey UE side beam weights in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for a UE to request sounding reference signal resources and a base station to convey UE side beam weights). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for a UE to request sounding reference signal resources and a base station to convey UE side beam weights). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for a UE to request sounding reference signal resources and a base station to convey UE side beam weights as described herein. For example, the communications manager 1020 may include a resource request component 1025, a reference signal resource indicating component 1030, a reference signal reception component 1035, a beam parameter indication component 1040, a beamformed communications component 1045, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The resource request component 1025 may be configured as or otherwise support a means for receiving, from a UE, a request for uplink reference signal resources for a beam training procedure. The reference signal resource indicating component 1030 may be configured as or otherwise support a means for transmitting, in response to the received request, control signaling indicating the uplink reference signal resources for the beam training procedure. The reference signal reception component 1035 may be configured as or otherwise support a means for receiving reference signals on the identified uplink reference signal resources transmitted by a set of multiple beams. The beam parameter indication component 1040 may be configured as or otherwise support a means for transmitting, in response to the received reference signals, an indication of beam parameters for a beam to be used at the UE. The beamformed communications component 1045 may be configured as or otherwise support a means for communicating with the UE using a beam and the beam according to the beam parameters transmitted to the UE.

Figure 11:
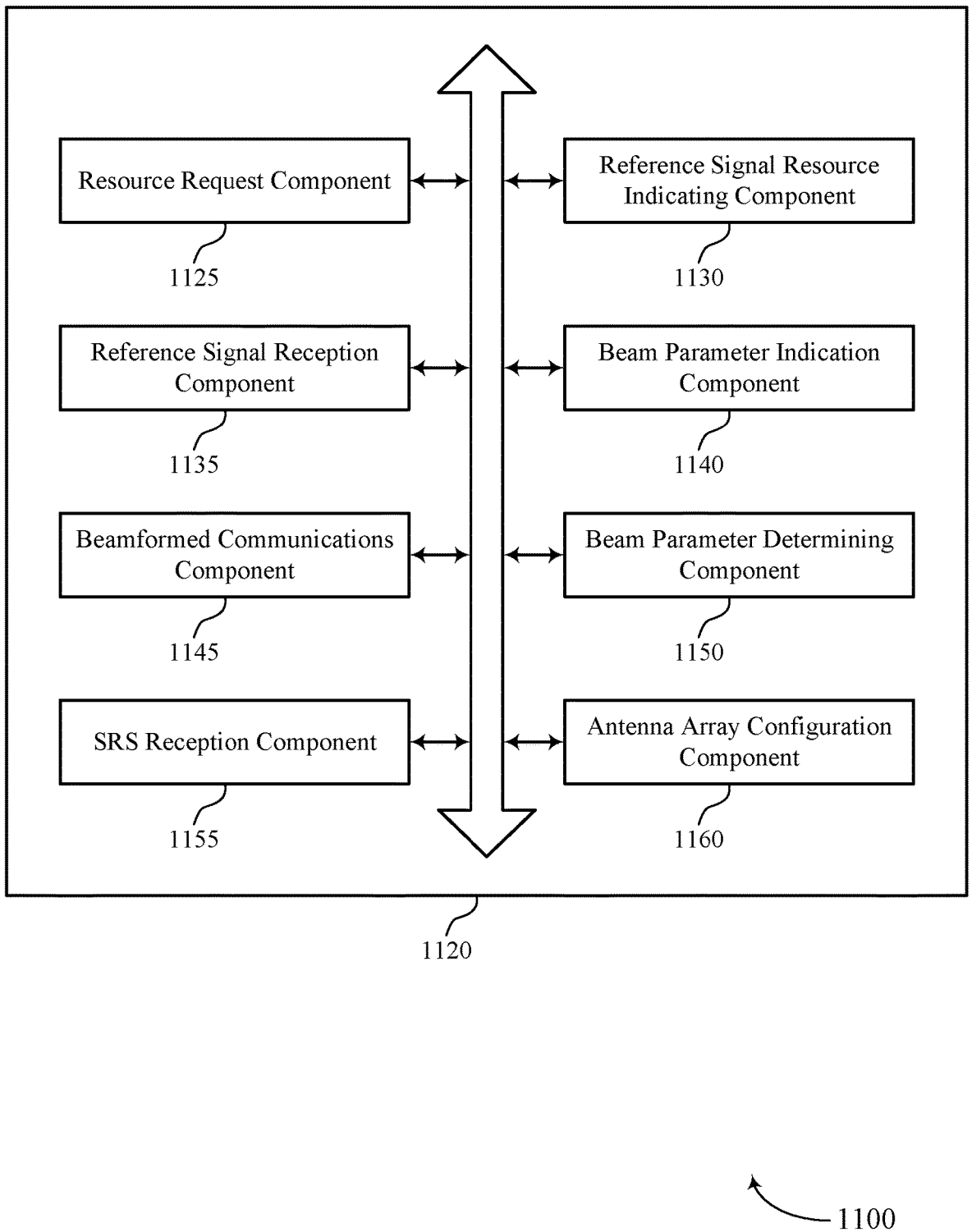
FIG. 11 shows a block diagram of a communications manager that supports techniques for a UE to request sounding reference signal resources and a base station to convey UE side beam weights in accordance with aspects of the present disclosure.

FIG. 11 shows a block diagram 1100 of a communications manager 1120 that supports techniques for a UE to request sounding reference signal resources and a base station to convey UE side beam weights in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for a UE to request sounding reference signal resources and a base station to convey UE side beam weights as described herein. For example, the communications manager 1120 may include a resource request component 1125, a reference signal resource indicating component 1130, a reference signal reception component 1135, a beam parameter indication component 1140, a beamformed communications component 1145, a beam parameter determining component 1150, an SRS reception component 1155, an antenna array configuration component 1160, or any combination thereof. Each of these components may communicate, directly or indirectly, with one another (e.g., via one or more buses).

The communications manager 1120 may support wireless communications at a base station in accordance with examples as disclosed herein. The resource request component 1125 may be configured as or otherwise support a means for receiving, from a UE, a request for uplink reference signal resources for a beam training procedure. The reference signal resource indicating component 1130 may be configured as or otherwise support a means for transmitting, in response to the received request, control signaling indicating the uplink reference signal resources for the beam training procedure. The reference signal reception component 1135 may be configured as or otherwise support a means for receiving reference signals on the identified uplink reference signal resources transmitted by a set of multiple beams. The beam parameter indication component 1140 may be configured as or otherwise support a means for transmitting, in response to the received reference signals, an indication of beam parameters for a beam to be used at the UE. The beamformed communications component 1145 may be configured as or otherwise support a means for communicating with the UE using a beam and the beam according to the beam parameters transmitted to the UE.

In some examples, the beam parameter determining component 1150 may be configured as or otherwise support a means for determining a first set of beam parameters for the beam at the UE side and a second set of beam parameters for the base station-side beam based on the received reference signals, where the indication of the beam parameters for the beam at the UE side indicates the first set of beam parameters or the first set of beam parameters and the second set of beam parameters.

In some examples, to support transmitting the indication of the beam parameters, the beam parameter indication component 1140 may be configured as or otherwise support a means for transmitting an indication of a phase shift or an amplitude, or both, for the beam, where communicating with the base station using the beam is based on the phase shift or the amplitude, or both.

In some examples, to support transmitting the indication of the beam parameters, the beam parameter indication component 1140 may be configured as or otherwise support a means for transmitting an indication of a set of sounding reference signal resource indicators and a corresponding set of beam weights for the set of sounding reference signal resource indicators, where the reference signals are received based on the set of sounding reference signal resource indicators.

In some examples, to support receiving the request for the uplink reference signal resources, the resource request component 1125 may be configured as or otherwise support a means for receiving the request including a number of resources and a time-frequency assignment within the resource block grid for the reference signals, where the control signaling indicates the uplink reference signal resources based on the number of resources and the time-frequency assignment request.

In some examples, the number of resources is based on an uplink link budget, a first number of antennas at the UE, a second number of antennas at the base station, a first number of radio frequency transmit/receive chains at the UE, a second number of radio frequency transmit/receive chains at the base station, or any combination thereof.

In some examples, to support receiving the uplink reference signals, the SRS reception component 1155 may be configured as or otherwise support a means for receiving sounding reference signals transmitted by the set of multiple beams on the identified uplink reference signal resources.

In some examples, the antenna array configuration component 1160 may be configured as or otherwise support a means for receiving, from the UE, an indication of an antenna array configuration at the UE, where the beam parameters for the beam at the UE are based on the antenna array configuration.

In some examples, the indication of the antenna array configuration is received based on the transmitted control signaling indicating more uplink reference signal resources than supported beamforming vectors at the UE.

In some examples, to support transmitting the indication of the beam parameters for the beam at the UE, the beam parameter indication component 1140 may be configured as or otherwise support a means for transmitting an indication of a set of adaptive beam weights, where the set of adaptive beam weights are for the beam at the UE, or the base station-side beam, or both, and where communicating with the UE is based on the set of adaptive beam weights.

In some examples, to support transmitting the indication of the beam parameters for the beam at the UE, the beam parameter indication component 1140 may be configured as or otherwise support a means for transmitting a DCI message or RRC signaling or a medium access control-control element (MAC-CE) indicating the beam parameters.

In some examples, the uplink reference signal resources are contiguous in a time domain or a frequency domain.

Figure 12:
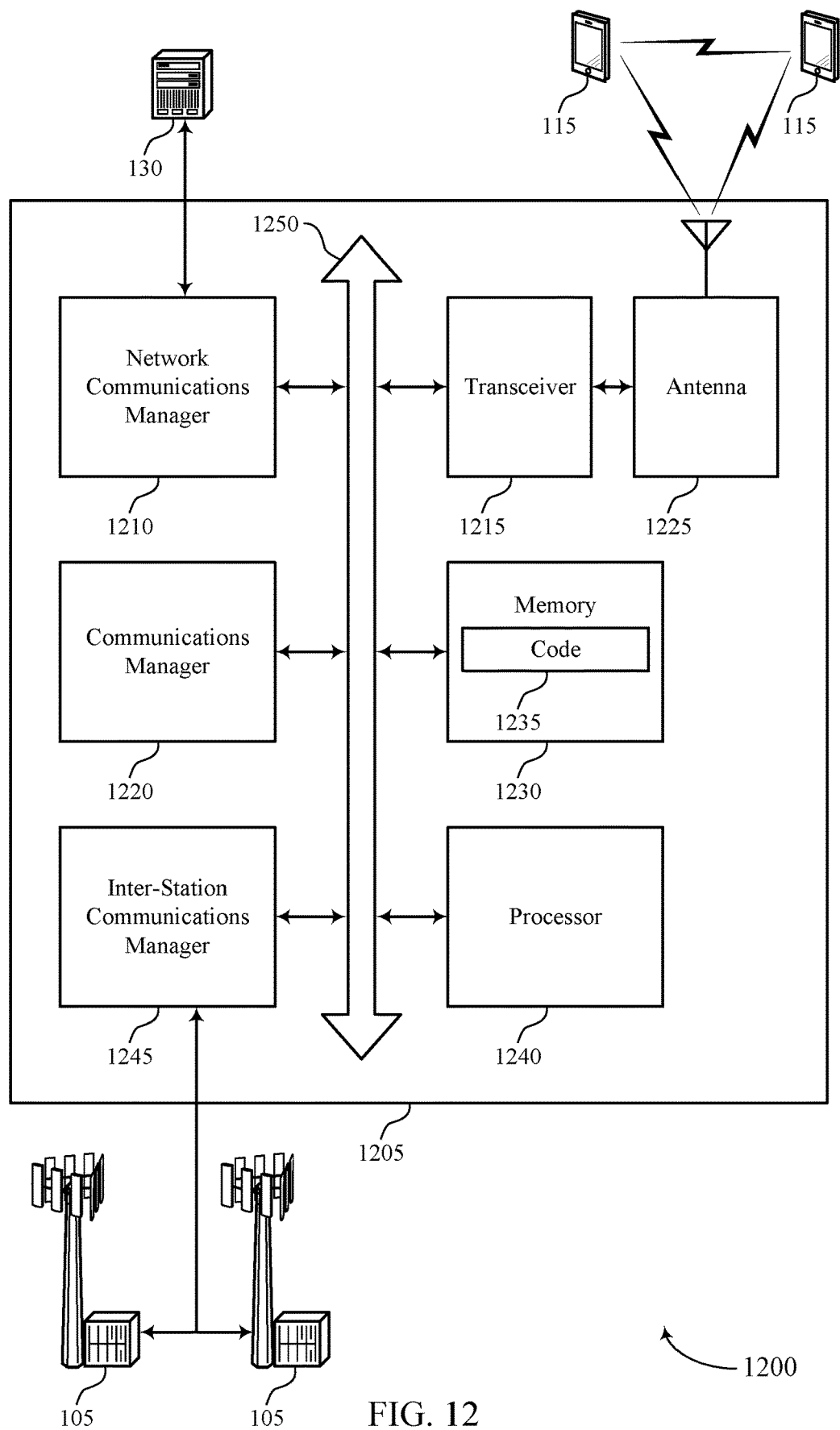
FIG. 12 shows a diagram of a system including a device that supports techniques for a UE to request sounding reference signal resources and a base station to convey UE side beam weights in accordance with aspects of the present disclosure.

FIG. 12 shows a diagram of a system 1200 including a device 1205 that supports techniques for a UE to request sounding reference signal resources and a base station to convey UE side beam weights in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for a UE to request sounding reference signal resources and a base station to convey UE side beam weights). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, a request for uplink reference signal resources for a beam training procedure. The communications manager 1220 may be configured as or otherwise support a means for transmitting, in response to the received request, control signaling indicating the uplink reference signal resources for the beam training procedure. The communications manager 1220 may be configured as or otherwise support a means for receiving reference signals on the identified uplink reference signal resources transmitted by a set of multiple beams. The communications manager 1220 may be configured as or otherwise support a means for transmitting, in response to the received reference signals, an indication of beam parameters for a beam to be used at the UE. The communications manager 1220 may be configured as or otherwise support a means for communicating with the UE using a beam and the beam according to the beam parameters transmitted to the UE.

By including or configuring the communications manager 1220 in accordance with examples as described herein, the device 1205 may support techniques for By performing uplink beam training at a base station 105 and indicating adaptive beam weights to a UE 115 for a beam, the UE 115 and the base station 105 may communicate using higher quality beams.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for a UE to request sounding reference signal resources and a base station to convey UE side beam weights as described herein, or the processor 1240 and the memory 1230 may be otherwise configured to perform or support such operations.

Figure 13:
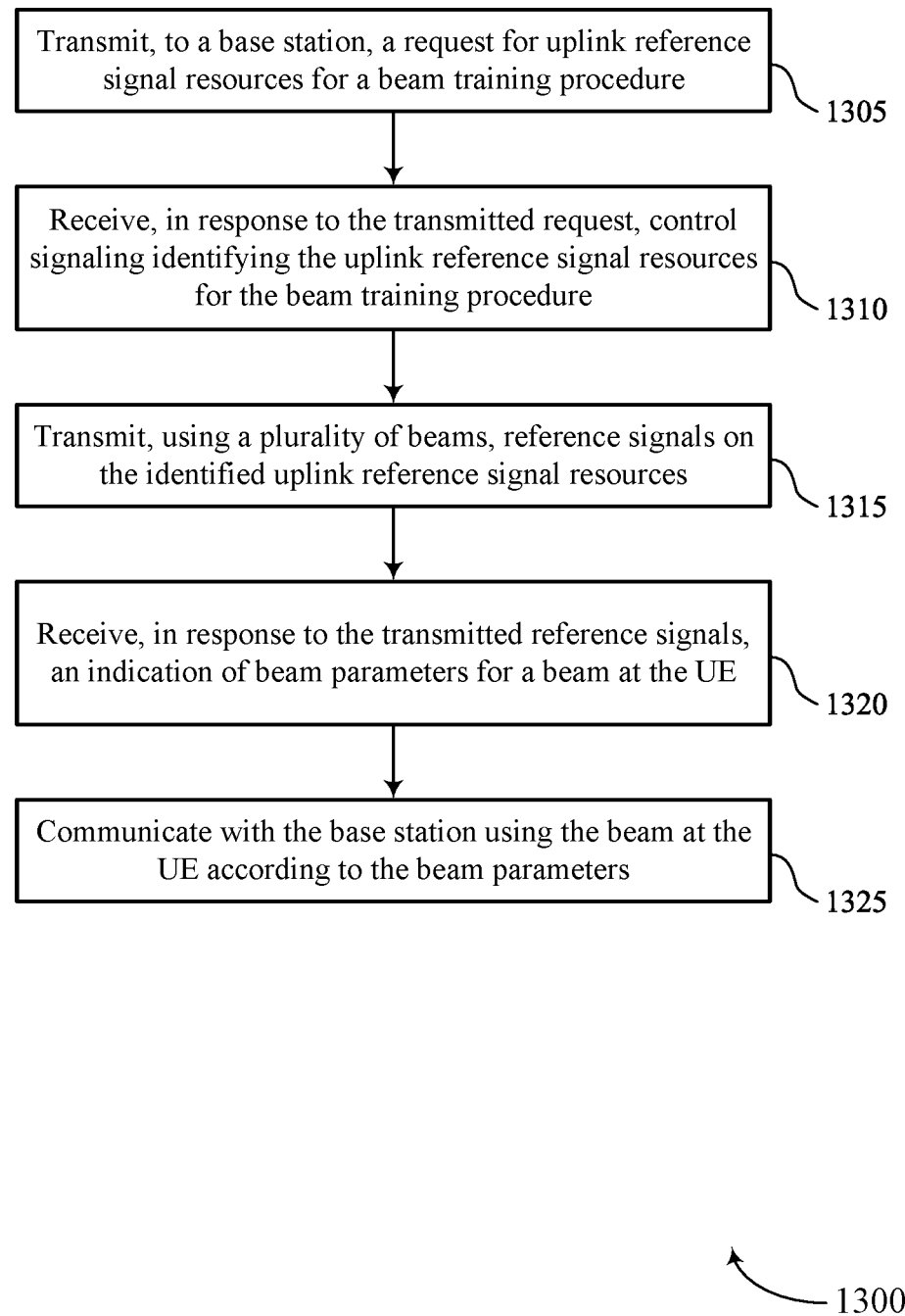
FIGS. 13 through 17 show flowcharts illustrating methods that support techniques for a UE to request sounding reference signal resources and a base station to convey UE side beam weights in accordance with aspects of the present disclosure.

FIG. 13 shows a flowchart illustrating a method 1300 that supports techniques for a UE to request sounding reference signal resources and a base station to convey UE side beam weights in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include transmitting, to a base station, a request for uplink reference signal resources for a beam training procedure. The operations of 1305 may be performed in accordance with examples as disclosed herein. In some examples, aspects of the operations of 1305 may be performed by a resource request component 725 as described with reference to FIG. 7.

At 1310, the method may include receiving, in response to the transmitted request, control signaling identifying the uplink reference signal resources for the beam training procedure. The operations of 1310 may be performed in accordance with examples as disclosed herein. In some examples, aspects of the operations of 1310 may be performed by a reference signal resource identifying component 730 as described with reference to FIG. 7.

At 1315, the method may include transmitting, using a set of multiple beams, reference signals on the identified uplink reference signal resources. The operations of 1315 may be performed in accordance with examples as disclosed herein. In some examples, aspects of the operations of 1315 may be performed by a reference signal transmission component 735 as described with reference to FIG. 7.

At 1320, the method may include receiving, in response to the transmitted reference signals, an indication of beam parameters for a beam at the UE. The operations of 1320 may be performed in accordance with examples as disclosed herein. In some examples, aspects of the operations of 1320 may be performed by a beam parameter indication component 740 as described with reference to FIG. 7.

At 1325, the method may include communicating with the base station using the beam at the UE according to the beam parameters. The operations of 1325 may be performed in accordance with examples as disclosed herein. In some examples, aspects of the operations of 1325 may be performed by a beamformed communications component 745 as described with reference to FIG. 7.

Figure 14:
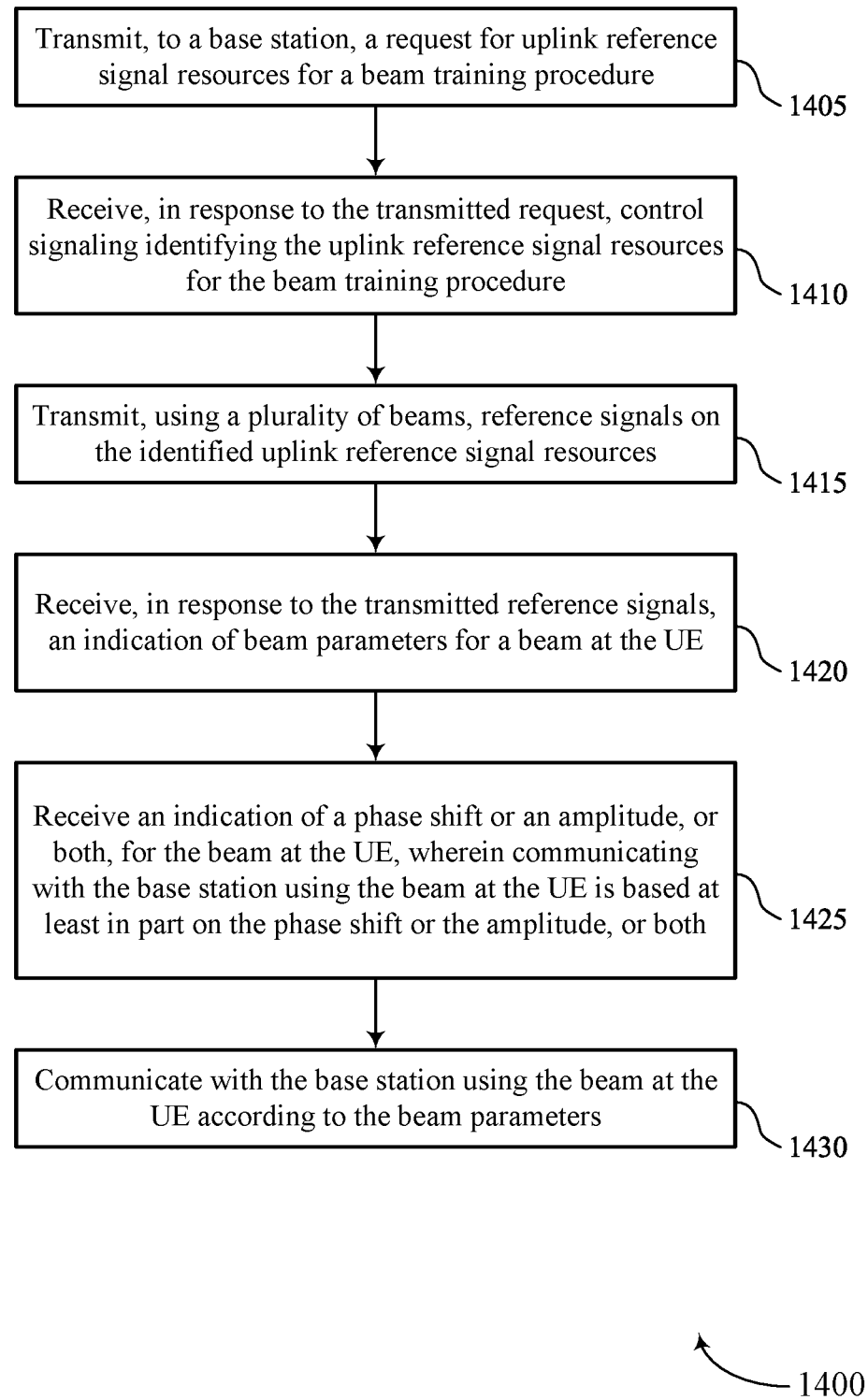

FIG. 14 shows a flowchart illustrating a method 1400 that supports techniques for a UE to request sounding reference signal resources and a base station to convey UE side beam weights in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include transmitting, to a base station, a request for uplink reference signal resources for a beam training procedure. The operations of 1405 may be performed in accordance with examples as disclosed herein. In some examples, aspects of the operations of 1405 may be performed by a resource request component 725 as described with reference to FIG. 7.

At 1410, the method may include receiving, in response to the transmitted request, control signaling identifying the uplink reference signal resources for the beam training procedure. The operations of 1410 may be performed in accordance with examples as disclosed herein. In some examples, aspects of the operations of 1410 may be performed by a reference signal resource identifying component 730 as described with reference to FIG. 7.

At 1415, the method may include transmitting, using a set of multiple beams, reference signals on the identified uplink reference signal resources. The operations of 1415 may be performed in accordance with examples as disclosed herein. In some examples, aspects of the operations of 1415 may be performed by a reference signal transmission component 735 as described with reference to FIG. 7.

At 1420, the method may include receiving, in response to the transmitted reference signals, an indication of beam parameters for a beam at the UE. The operations of 1420 may be performed in accordance with examples as disclosed herein. In some examples, aspects of the operations of 1420 may be performed by a beam parameter indication component 740 as described with reference to FIG. 7.

At 1425, the method may include receiving an indication of a phase shift or an amplitude, or both, for the beam at the UE, where communicating with the base station using the beam at the UE is based on the phase shift or the amplitude, or both. The operations of 1425 may be performed in accordance with examples as disclosed herein. In some examples, aspects of the operations of 1425 may be performed by a beam parameter indication component 740 as described with reference to FIG. 7.

At 1430, the method may include communicating with the base station using the beam at the UE according to the beam parameters. The operations of 1430 may be performed in accordance with examples as disclosed herein. In some examples, aspects of the operations of 1430 may be performed by a beamformed communications component 745 as described with reference to FIG. 7.

Figure 15:
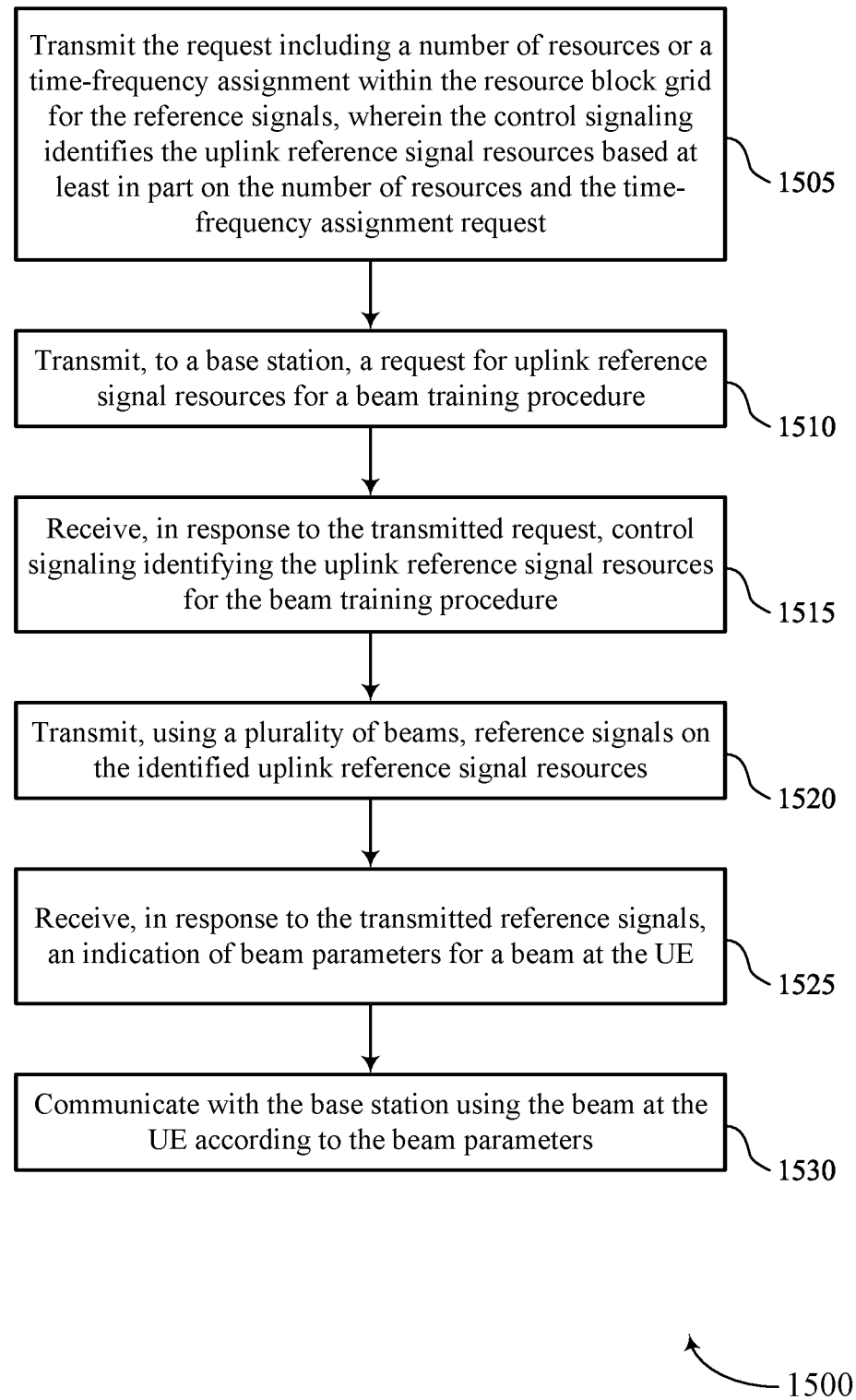

FIG. 15 shows a flowchart illustrating a method 1500 that supports techniques for a UE to request sounding reference signal resources and a base station to convey UE side beam weights in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include transmitting the request including a number of resources or a time-frequency assignment within the resource block grid for the reference signals, where the control signaling identifies the uplink reference signal resources based on the number of resources and the time-frequency assignment request. The operations of 1505 may be performed in accordance with examples as disclosed herein. In some examples, aspects of the operations of 1505 may be performed by a resource request component 725 as described with reference to FIG. 7.

At 1510, the method may include transmitting, to a base station, a request for uplink reference signal resources for a beam training procedure. The operations of 1510 may be performed in accordance with examples as disclosed herein. In some examples, aspects of the operations of 1510 may be performed by a resource request component 725 as described with reference to FIG. 7.

At 1515, the method may include receiving, in response to the transmitted request, control signaling identifying the uplink reference signal resources for the beam training procedure. The operations of 1515 may be performed in accordance with examples as disclosed herein. In some examples, aspects of the operations of 1515 may be performed by a reference signal resource identifying component 730 as described with reference to FIG. 7.

At 1520, the method may include transmitting, using a set of multiple beams, reference signals on the identified uplink reference signal resources. The operations of 1520 may be performed in accordance with examples as disclosed herein. In some examples, aspects of the operations of 1520 may be performed by a reference signal transmission component 735 as described with reference to FIG. 7.

At 1525, the method may include receiving, in response to the transmitted reference signals, an indication of beam parameters for a beam at the UE. The operations of 1525 may be performed in accordance with examples as disclosed herein. In some examples, aspects of the operations of 1525 may be performed by a beam parameter indication component 740 as described with reference to FIG. 7.

At 1530, the method may include communicating with the base station using the beam at the UE according to the beam parameters. The operations of 1530 may be performed in accordance with examples as disclosed herein. In some examples, aspects of the operations of 1530 may be performed by a beamformed communications component 745 as described with reference to FIG. 7.

Figure 16:
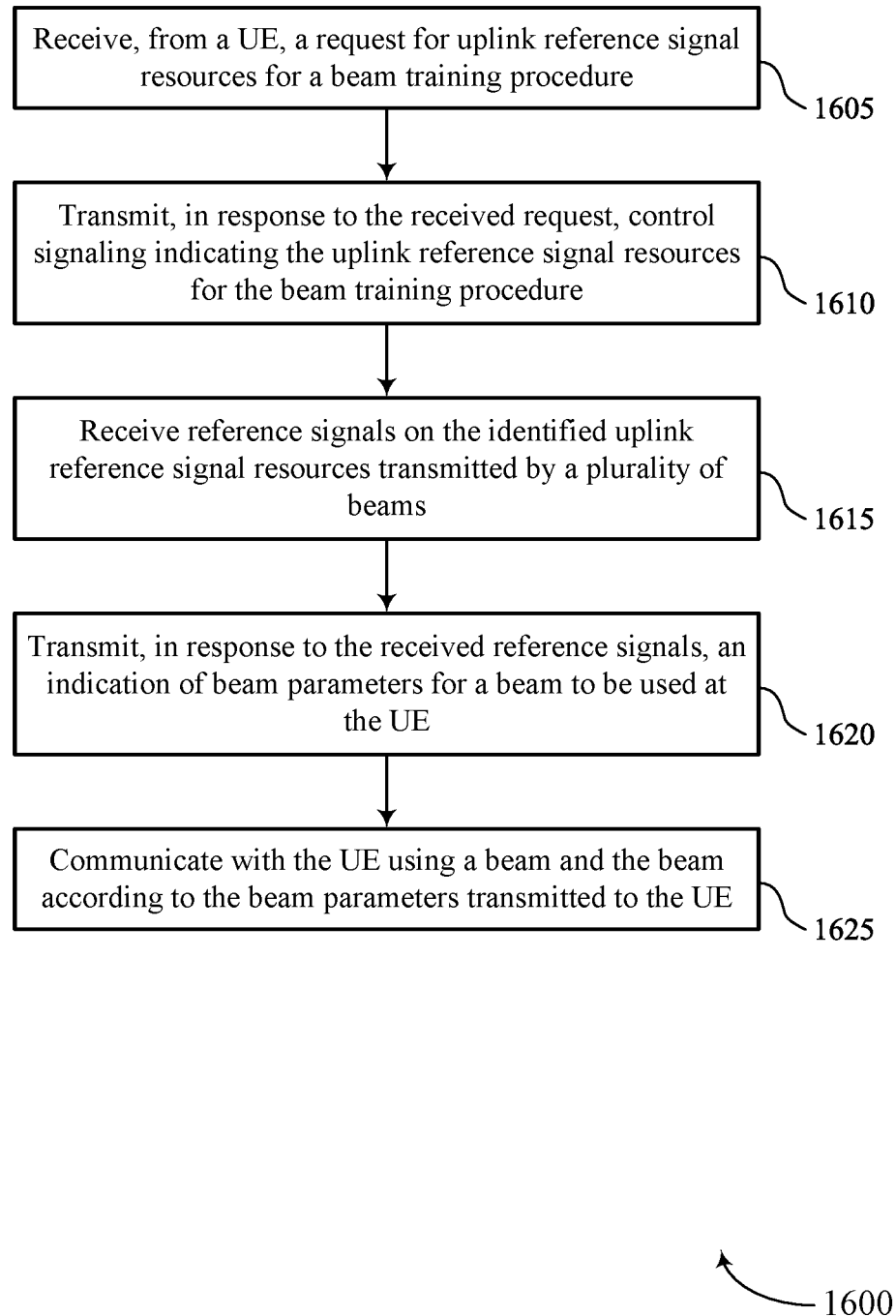

FIG. 16 shows a flowchart illustrating a method 1600 that supports techniques for a UE to request sounding reference signal resources and a base station to convey UE side beam weights in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include receiving, from a UE, a request for uplink reference signal resources for a beam training procedure. The operations of 1605 may be performed in accordance with examples as disclosed herein. In some examples, aspects of the operations of 1605 may be performed by a resource request component 1125 as described with reference to FIG. 11.

At 1610, the method may include transmitting, in response to the received request, control signaling indicating the uplink reference signal resources for the beam training procedure. The operations of 1610 may be performed in accordance with examples as disclosed herein. In some examples, aspects of the operations of 1610 may be performed by a reference signal resource indicating component 1130 as described with reference to FIG. 11.

At 1615, the method may include receiving reference signals on the identified uplink reference signal resources transmitted by a set of multiple beams. The operations of 1615 may be performed in accordance with examples as disclosed herein. In some examples, aspects of the operations of 1615 may be performed by a reference signal reception component 1135 as described with reference to FIG. 11.

At 1620, the method may include transmitting, in response to the received reference signals, an indication of beam parameters for a beam to be used at the UE. The operations of 1620 may be performed in accordance with examples as disclosed herein. In some examples, aspects of the operations of 1620 may be performed by a beam parameter indication component 1140 as described with reference to FIG. 11.

At 1625, the method may include communicating with the UE using a beam and the beam according to the beam parameters transmitted to the UE. The operations of 1625 may be performed in accordance with examples as disclosed herein. In some examples, aspects of the operations of 1625 may be performed by a beamformed communications component 1145 as described with reference to FIG. 11.

Figure 17:
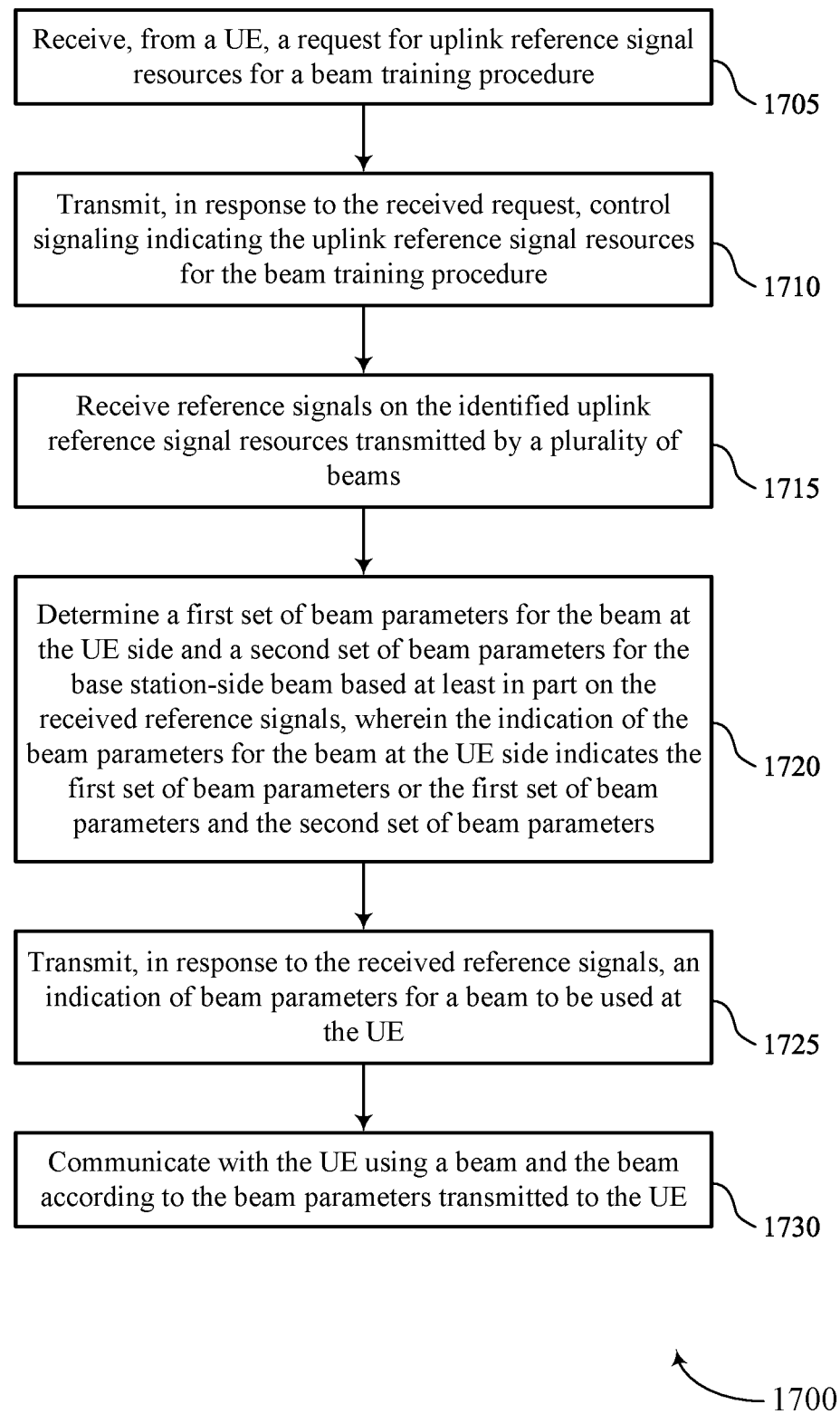

FIG. 17 shows a flowchart illustrating a method 1700 that supports techniques for a UE to request sounding reference signal resources and a base station to convey UE side beam weights in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include receiving, from a UE, a request for uplink reference signal resources for a beam training procedure. The operations of 1705 may be performed in accordance with examples as disclosed herein. In some examples, aspects of the operations of 1705 may be performed by a resource request component 1125 as described with reference to FIG. 11.

At 1710, the method may include transmitting, in response to the received request, control signaling indicating the uplink reference signal resources for the beam training procedure. The operations of 1710 may be performed in accordance with examples as disclosed herein. In some examples, aspects of the operations of 1710 may be performed by a reference signal resource indicating component 1130 as described with reference to FIG. 11.

At 1715, the method may include receiving reference signals on the identified uplink reference signal resources transmitted by a set of multiple beams. The operations of 1715 may be performed in accordance with examples as disclosed herein. In some examples, aspects of the operations of 1715 may be performed by a reference signal reception component 1135 as described with reference to FIG. 11.

At 1720, the method may include determining a first set of beam parameters for the beam at the UE side and a second set of beam parameters for the base station-side beam based on the received reference signals, where the indication of the beam parameters for the beam at the UE side indicates the first set of beam parameters or the first set of beam parameters and the second set of beam parameters. The operations of 1720 may be performed in accordance with examples as disclosed herein. In some examples, aspects of the operations of 1720 may be performed by a beam parameter determining component 1150 as described with reference to FIG. 11.

At 1725, the method may include transmitting, in response to the received reference signals, an indication of beam parameters for a beam to be used at the UE. The operations of 1725 may be performed in accordance with examples as disclosed herein. In some examples, aspects of the operations of 1725 may be performed by a beam parameter indication component 1140 as described with reference to FIG. 11.

At 1730, the method may include communicating with the UE using a beam and the beam according to the beam parameters transmitted to the UE. The operations of 1730 may be performed in accordance with examples as disclosed herein. In some examples, aspects of the operations of 1730 may be performed by a beamformed communications component 1145 as described with reference to FIG. 11.

The following provides an overview of aspects of the present disclosure:

Aspect 1: A method for wireless communications at a UE, comprising: transmitting, to a base station, a request for uplink reference signal resources for a beam training procedure; receiving, in response to the transmitted request, control signaling identifying the uplink reference signal resources for the beam training procedure; transmitting, using a plurality of beams, reference signals on the identified uplink reference signal resources; receiving, in response to the transmitted reference signals, an indication of beam parameters for a beam at the UE; and communicating with the base station using the beam at the UE according to the beam parameters.

Aspect 2: The method of aspect 1, wherein receiving the indication of the beam parameters comprises: receiving an indication of a phase shift or an amplitude, or both, for the beam at the UE, wherein communicating with the base station using the beam at the UE is based at least in part on the phase shift or the amplitude, or both.

Aspect 3: The method of any of aspects 1 through 2, wherein receiving the indication of the beam parameters for the beam at the UE comprises: receiving an indication of a set of adaptive beam weights, wherein the set of adaptive beam weights are for the beam at the UE, or one or more beams of the base station, or both, and wherein communicating with the base station is based at least in part on the set of adaptive beam weights.

Aspect 4: The method of any of aspects 1 through 3, wherein receiving the indication of the beam parameters comprises: receiving an indication of a set of sounding reference signal resource indicators and a corresponding set of beam weights for the set of sounding reference signal resource indicators, wherein the reference signals are transmitted based at least in part on the set of sounding reference signal resource indicators.

Aspect 5: The method of any of aspects 1 through 4, wherein transmitting the request for the uplink reference signal resources comprises: transmitting the request including a number of resources or a time-frequency assignment within the resource block grid for the reference signals, wherein the control signaling identifies the uplink reference signal resources based at least in part on the number of resources and the time-frequency assignment request.

Aspect 6: The method of aspect 5, wherein the number of resources is based at least in part on an uplink link budget, a first number of antennas at the UE, a second number of antennas at the base station, a first number of radio frequency transmit/receive chains at the UE, a second number of radio frequency transmit/receive chains at the base station, or any combination thereof.

Aspect 7: The method of any of aspects 1 through 6, further comprising: determining that a channel quality for a fixed beam associated with a fixed codebook fails to satisfy a threshold channel quality, the request transmitted in response to the channel quality failing to satisfy the threshold channel quality.

Aspect 8: The method of any of aspects 1 through 7, further comprising: transmitting, to the base station, an indication of an antenna array configuration at the UE, wherein the reference signals are transmitted on the plurality of beams according to the antenna array configuration.

Aspect 9: The method of aspect 8, wherein the indication of the antenna array configuration is transmitted based at least in part on the received control signaling identifying more uplink reference signal resources than supported beamforming vectors at the UE.

Aspect 10: The method of any of aspects 1 through 9, wherein transmitting the uplink reference signals comprises: transmitting sounding reference signals on the plurality of beams on the identified uplink reference signal resources.

Aspect 11: The method of any of aspects 1 through 10, wherein receiving the indication of the beam parameters comprises: receiving a DCI message or RRC signaling or MAC-CE indicating the beam parameters.

Aspect 12: The method of any of aspects 1 through 11, wherein the uplink reference signal resources are contiguous in a time domain or a frequency domain.

Aspect 13: A method for wireless communications at a base station, comprising: receiving, from a UE, a request for uplink reference signal resources for a beam training procedure; transmitting, in response to the received request, control signaling indicating the uplink reference signal resources for the beam training procedure; receiving reference signals on the identified uplink reference signal resources transmitted by a plurality of beams; transmitting, in response to the received reference signals, an indication of beam parameters for a beam to be used at the UE; and communicating with the UE using a beam and the beam according to the beam parameters transmitted to the UE.

Aspect 14: The method of aspect 13, further comprising: determining a first set of beam parameters for the beam at the UE side and a second set of beam parameters for the base station-side beam based at least in part on the received reference signals, wherein the indication of the beam parameters for the beam at the UE side indicates the first set of beam parameters or the first set of beam parameters and the second set of beam parameters.

Aspect 15: The method of any of aspects 13 through 14, wherein transmitting the indication of the beam parameters comprises: transmitting an indication of a phase shift or an amplitude, or both, for the beam, wherein communicating with the base station using the beam is based at least in part on the phase shift or the amplitude, or both.

Aspect 16: The method of any of aspects 13 through 15, wherein transmitting the indication of the beam parameters comprises: transmitting an indication of a set of sounding reference signal resource indicators and a corresponding set of beam weights for the set of sounding reference signal resource indicators, wherein the reference signals are received based at least in part on the set of sounding reference signal resource indicators.

Aspect 17: The method of any of aspects 13 through 16, wherein receiving the request for the uplink reference signal resources comprises: receiving the request including a number of resources and a time-frequency assignment within the resource block grid for the reference signals, wherein the control signaling indicates the uplink reference signal resources based at least in part on the number of resources and the time-frequency assignment request.

Aspect 18: The method of aspect 17, wherein the number of resources is based at least in part on an uplink link budget, a first number of antennas at the UE, a second number of antennas at the base station, a first number of radio frequency transmit/receive chains at the UE, a second number of radio frequency transmit/receive chains at the base station, or any combination thereof.

Aspect 19: The method of any of aspects 13 through 18, wherein receiving the uplink reference signals comprises: receiving sounding reference signals transmitted by the plurality of beams on the identified uplink reference signal resources.

Aspect 20: The method of any of aspects 13 through 19, further comprising: receiving, from the UE, an indication of an antenna array configuration at the UE, wherein the beam parameters for the beam at the UE are based at least in part on the antenna array configuration.

Aspect 21: The method of aspect 20, wherein the indication of the antenna array configuration is received based at least in part on the transmitted control signaling indicating more uplink reference signal resources than supported beamforming vectors at the UE.

Aspect 22: The method of any of aspects 13 through 21, wherein transmitting the indication of the beam parameters for the beam at the UE comprises: transmitting an indication of a set of adaptive beam weights, wherein the set of adaptive beam weights are for the beam at the UE, or the base station-side beam, or both, and wherein communicating with the UE is based at least in part on the set of adaptive beam weights.

Aspect 23: The method of any of aspects 13 through 22, wherein transmitting the indication of the beam parameters for the beam at the UE comprises: transmitting a DCI message or RRC signaling or a MAC-CE indicating the beam parameters.

Aspect 24: The method of any of aspects 13 through 23, wherein the uplink reference signal resources are contiguous in a time domain or a frequency domain.

Aspect 25: An apparatus for wireless communications at a UE, comprising a processor; memory coupled with the processor; and instructions stored in the memory and executable by the processor to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a base station, comprising a processor; memory coupled with the processor; and instructions stored in the memory and executable by the processor to cause the apparatus to perform a method of any of aspects 13 through 24.

Aspect 29: An apparatus for wireless communications at a base station, comprising at least one means for performing a method of any of aspects 13 through 24.

Aspect 30: A non-transitory computer-readable medium storing code for wireless communications at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
    transmitting, to a network device, a request for uplink reference signal resources for a beam training procedure;
    receiving, in response to the transmitted request, control signaling identifying the uplink reference signal resources for the beam training procedure;
    transmitting, using a plurality of beams, reference signals on the identified uplink reference signal resources;
    receiving, in response to the transmitted reference signals, an indication of beam parameters for a beam at the UE; and
    communicating with the network device using the beam at the UE according to the beam parameters.

2. The method of claim 1, wherein receiving the indication of the beam parameters comprises:
    receiving an indication of a phase shift or an amplitude, or both, for the beam at the UE, wherein communicating with the network device using the beam at the UE is based at least in part on the phase shift or the amplitude, or both.

3. The method of claim 1, wherein receiving the indication of the beam parameters for the beam at the UE comprises:
    receiving an indication of a set of adaptive beam weights, wherein the set of adaptive beam weights are for the beam at the UE, or one or more beams of the network device, or both, and wherein communicating with the network device is based at least in part on the set of adaptive beam weights.

4. The method of claim 1, wherein receiving the indication of the beam parameters comprises:
    receiving an indication of a set of sounding reference signal resource indicators and a corresponding set of beam weights for the set of sounding reference signal resource indicators, wherein the reference signals are transmitted based at least in part on the set of sounding reference signal resource indicators.

5. The method of claim 1, wherein transmitting the request for the uplink reference signal resources comprises:
    transmitting the request including a number of resources and a time-frequency assignment within a resource block grid for the reference signals, wherein the control signaling identifies the uplink reference signal resources based at least in part on the number of resources and the time-frequency assignment.

6. The method of claim 5, wherein the number of resources is based at least in part on an uplink link budget, a first number of antennas at the UE, a second number of antennas at the network device, a first number of radio frequency transmit/receive chains at the UE, a second number of radio frequency transmit/receive chains at the network device, or any combination thereof.

7. The method of claim 1, further comprising:
    determining that a channel quality for a fixed beam associated with a fixed codebook fails to satisfy a threshold channel quality, the request transmitted in response to the channel quality failing to satisfy the threshold channel quality.

8. The method of claim 1, further comprising:
    transmitting, to the network device, an indication of an antenna array configuration at the UE, wherein the reference signals are transmitted on the plurality of beams according to the antenna array configuration.

9. The method of claim 8, wherein the indication of the antenna array configuration is transmitted based at least in part on the received control signaling identifying more uplink reference signal resources than supported beamforming vectors at the UE.

10. The method of claim 1, wherein transmitting the uplink reference signals comprises:
    transmitting sounding reference signals on the plurality of beams on the identified uplink reference signal resources.

11. The method of claim 1, wherein receiving the indication of the beam parameters comprises:
    receiving a downlink control information (DCI) message or radio resource control (RRC) signaling or medium access control-control element (MAC-CE) indicating the beam parameters.

12. The method of claim 1, wherein the uplink reference signal resources are contiguous in a time domain or a frequency domain.

13. A method for wireless communications at a network device, comprising:
    receiving, from a user equipment (UE), a request for uplink reference signal resources for a beam training procedure;
    transmitting, in response to the received request, control signaling indicating the uplink reference signal resources for the beam training procedure;
    receiving reference signals on the indicated uplink reference signal resources transmitted by a plurality of beams;
    transmitting, in response to the received reference signals, an indication of beam parameters for a beam to be used at the UE; and
    communicating with the UE using a beam and the beam according to the beam parameters transmitted to the UE.

14. The method of claim 13, further comprising:
    determining a first set of beam parameters for the beam to be used at the UE and a second set of beam parameters for the beam based at least in part on the received reference signals, wherein the indication of the beam parameters for the beam to be used at the UE indicates the first set of beam parameters or the first set of beam parameters and the second set of beam parameters.

15. The method of claim 13, wherein transmitting the indication of the beam parameters comprises:
  transmitting an indication of a phase shift or an amplitude, or both, for the beam, wherein communicating with the network device using the beam is based at least in part on the phase shift or the amplitude, or both.

16. The method of claim 13, wherein transmitting the indication of the beam parameters comprises:
  transmitting an indication of a set of sounding reference signal resource indicators and a corresponding set of beam weights for the set of sounding reference signal resource indicators, wherein the reference signals are received based at least in part on the set of sounding reference signal resource indicators.

17. The method of claim 13, wherein receiving the request for the uplink reference signal resources comprises:
  receiving the request including a number of resources and a time-frequency assignment within a resource block grid for the reference signals, wherein the control signaling indicates the uplink reference signal resources based at least in part on the number of resources and the time-frequency assignment.

18. The method of claim 17, wherein the number of resources is based at least in part on an uplink link budget, a first number of antennas at the UE, a second number of antennas at the network device, a first number of radio frequency transmit/receive chains at the UE, a second number of radio frequency transmit/receive chains at the network device, or any combination thereof.

19. The method of claim 13, wherein receiving the uplink reference signals comprises:
  receiving sounding reference signals transmitted by the plurality of beams on the indicated uplink reference signal resources.

20. The method of claim 13, further comprising:
  receiving, from the UE, an indication of an antenna array configuration at the UE, wherein the beam parameters for the beam at the UE are based at least in part on the antenna array configuration.

21. The method of claim 20, wherein the indication of the antenna array configuration is received based at least in part on the transmitted control signaling indicating more uplink reference signal resources than supported beamforming vectors at the UE.

22. The method of claim 13, wherein transmitting the indication of the beam parameters for the beam at the UE comprises:
  transmitting an indication of a set of adaptive beam weights, wherein the set of adaptive beam weights are for the beam to be used at the UE, or the beam, or both, and wherein communicating with the UE is based at least in part on the set of adaptive beam weights.

23. The method of claim 13, wherein transmitting the indication of the beam parameters for the beam at the UE comprises:
  transmitting a downlink control information (DCI) message or radio resource control (RRC) signaling or a medium access control-control element (MAC-CE) indicating the beam parameters.

24. The method of claim 13, wherein the uplink reference signal resources are contiguous in a time domain or a frequency domain.

25. An apparatus for wireless communications at a user equipment (UE), comprising:
  a processor;
  memory coupled with the processor; and
  instructions stored in the memory and executable by the processor to cause the apparatus to:
    transmit, to a network device, a request for uplink reference signal resources for a beam training procedure;
    receive, in response to the transmitted request, control signaling identifying the uplink reference signal resources for the beam training procedure;
    transmit, using a plurality of beams, reference signals on the identified uplink reference signal resources;
    receive, in response to the transmitted reference signals, an indication of beam parameters for a beam at the UE; and
    communicate with the network device using the beam at the UE according to the beam parameters.

26. The apparatus of claim 25, wherein the instructions to receive the indication of the beam parameters are executable by the processor to cause the apparatus to:
  receive an indication of a phase shift or an amplitude, or both, for the beam at the UE, wherein communicating with the network device using the beam at the UE is based at least in part on the phase shift or the amplitude, or both.

27. The apparatus of claim 25, wherein the instructions to receive the indication of the beam parameters for the beam at the UE are executable by the processor to cause the apparatus to:
  receive an indication of a set of adaptive beam weights, wherein the set of adaptive beam weights are for the beam at the UE, or one or more beams of the network device, or both, and wherein communicating with network device is based at least in part on the set of adaptive beam weights.

28. The apparatus of claim 25, wherein the instructions to transmit the request for the uplink reference signal resources are executable by the processor to cause the apparatus to:
  transmit the request including a number of resources or a time-frequency assignment within a resource block grid for the reference signals, wherein the control signaling identifies the uplink reference signal resources based at least in part on the number of resources and the time-frequency assignment request.

29. An apparatus for wireless communications at a network device, comprising:
  a processor;
  memory coupled with the processor; and
  instructions stored in the memory and executable by the processor to cause the apparatus to:
    receive, from a user equipment (UE), a request for uplink reference signal resources for a beam training procedure;
    transmit, in response to the received request, control signaling indicating the uplink reference signal resources for the beam training procedure;
    receive reference signals on the indicated uplink reference signal resources transmitted by a plurality of beams;
    transmit, in response to the received reference signals, an indication of beam parameters for a beam to be used at the UE; and
    communicate with the UE using a beam and the beam according to the beam parameters transmitted to the UE.

30. The apparatus of claim 29, wherein the instructions are further executable by the processor to cause the apparatus to:

determine a first set of beam parameters for the beam to be used at the UE and a second set of beam parameters for the beam based at least in part on the received reference signals, wherein the indication of the beam parameters for the beam to be used at the UE indicates the first set of beam parameters or the first set of beam parameters and the second set of beam parameters.

* * * * *